US011289301B2

(12) United States Patent
Zhang et al.

(10) Patent No.: US 11,289,301 B2
(45) Date of Patent: Mar. 29, 2022

(54) MULTI-PIXEL X-RAY SOURCE WITH TUNGSTEN-DIAMOND TRANSMISSION TARGET

(71) Applicants: Tiezhi Zhang, St. Louis, MO (US); Praneeth Kandlakunta, St. Louis, MO (US)

(72) Inventors: Tiezhi Zhang, St. Louis, MO (US); Praneeth Kandlakunta, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 17/091,744

(22) Filed: Nov. 6, 2020

(65) Prior Publication Data
US 2021/0151273 A1    May 20, 2021

Related U.S. Application Data

(63) Continuation of application No. 16/405,310, filed on May 7, 2019, now abandoned.
(Continued)

(51) Int. Cl.
*H01J 35/08*  (2006.01)
*G06F 30/20*  (2020.01)
(Continued)

(52) U.S. Cl.
CPC ........... *H01J 35/116* (2019.05); *G06F 30/20* (2020.01); *H01J 35/12* (2013.01);
(Continued)

(58) Field of Classification Search
None
See application file for complete search history.

(56) References Cited

U.S. PATENT DOCUMENTS 7,245,692 B2   7/2007 Lu et al.
7,826,595 B2   11/2010 Liu et al.
(Continued)

FOREIGN PATENT DOCUMENTS

CN    107227442 A    10/2017

OTHER PUBLICATIONS

Kandlakunta, Preneeth et al., "Design and numerical simulations of W-diamond transmission target for distributed x-ray sources" Biomed. Phys. Eng. Express, 2019, vol. 5, No. 025030, pp. 1-13.

*Primary Examiner* — Hoon K Song
(74) *Attorney, Agent, or Firm* — Armstrong Teasdale LLP

(57) ABSTRACT

A multi-pixel x-ray source is provided. The x-ray source includes a plurality of transmission target assemblies. The transmission target assembly includes a tungsten target and a diamond substrate. The substrate includes a first transmission surface and a second transmission surface opposite first transmission surface. The substrate further includes a first side surface and a second side surface disposed between the first and second transmission surfaces. The target covers the first transmission surface of the substrate. The transmission target assembly further includes a base. The base surrounds the first and second side surfaces of substrate, exposing a collimator surface of the second transmission surface and the target. The transmission target assembly is configured to transmit x-ray generated by the target through the target and the substrate.

20 Claims, 21 Drawing Sheets
(18 of 21 Drawing Sheet(s) Filed in Color)

Related U.S. Application Data

(60) Provisional application No. 62/667,929, filed on May 7, 2018.

(51) Int. Cl.
*H05G 1/22* (2006.01)
*H01J 35/12* (2006.01)

(52) U.S. Cl.
CPC ... *H01J 2235/081* (2013.01); *H01J 2235/083* (2013.01); *H05G 1/22* (2013.01)

(56) References Cited

U.S. PATENT DOCUMENTS

| | | | |
|---|---|---|---|
| 8,189,893 B2 | 5/2012 | Zhang et al. | |
| 8,306,184 B2 | 11/2012 | Chang et al. | |
| 8,553,844 B2 | 10/2013 | Lewalter et al. | |
| 8,744,048 B2 | 6/2014 | Lee et al. | |
| 8,983,024 B2 | 3/2015 | Zhang et al. | |
| 8,995,610 B2 | 3/2015 | Ying et al. | |
| 9,008,278 B2 | 4/2015 | Lee et al. | |
| 9,068,927 B2 | 6/2015 | Lee et al. | |
| 9,339,243 B2 | 5/2016 | Zhang et al. | |
| 9,412,552 B2 | 8/2016 | Aoki et al. | |
| 9,448,190 B2 | 9/2016 | Yun et al. | |
| 9,594,036 B2 | 3/2017 | Yun et al. | |
| 9,646,801 B2 | 5/2017 | Dalakos et al. | |
| 9,715,989 B2 | 7/2017 | Dalakos et al. | |
| 9,761,404 B2 * | 9/2017 | Tang | G01N 23/046 |
| 9,823,203 B2 | 11/2017 | Yun et al. | |
| 9,874,531 B2 | 1/2018 | Yun et al. | |
| 2015/0092924 A1 | 4/2015 | Yun et al. | |
| 2016/0106382 A1 | 4/2016 | Lu et al. | |
| 2017/0032923 A1 | 2/2017 | Tsunoda et al. | |
| 2017/0287673 A1 | 10/2017 | Peterson et al. | |
| 2018/0005794 A1 | 1/2018 | Liang et al. | |
| 2018/0090293 A1 * | 3/2018 | Liang | H01J 35/08 |
| 2018/0190465 A1 * | 7/2018 | Huang | H01J 35/147 |
| 2019/0252150 A1 * | 8/2019 | Yamada | H01J 35/08 |

* cited by examiner

MULTI-PIXEL X-RAY SOURCE WITH TUNGSTEN-DIAMOND TRANSMISSION TARGET

CROSS-REFERENCE TO RELATED APPLICATION

This application is a continuation of U.S. application Ser. No. 16/405,310 filed May 7, 2019, entitled "MULTI-PIXEL X-RAY SOURCE WITH TUNGSTEN-DIAMOND TRANSMISSION TARGET," which is hereby incorporated herein by reference in its entirety. U.S. application Ser. No. 16/405,310 claims the benefit of U.S. Provisional Application Ser. No. 62/667,929 filed May 7, 2018, entitled "MULTI-PIXEL X-RAY SOURCE WITH W-DIAMOND TRANSMISSION TARGET," which is hereby incorporated herein by reference in its entirety.

STATEMENT REGARDING FEDERALLY SPONSORED RESEARCH & DEVELOPMENT

This invention was made with government support under Grant EB024952 awarded by the National Institutes of Health and W81XWH-17-1-0190 awarded by the ARMY Medical Research and Materiel Command (ARMY/MRMC). The government has certain rights in the invention.

BACKGROUND

Kilovoltage X-ray imaging is one of the most common diagnostic imaging modality in radiology as well as image guided intervention and radiotherapy. In x-ray generation, a high voltage is used to accelerate electrons released by a cathode to a high velocity and the high-velocity electrons collide with a target on an anode, creating x-rays. One of the predominant x-ray production processes is Bremsstrahlung interaction process, where radiation is given off by electrons as they are scattered by the strong electric field near high-Z (proton number) nuclei. This process is highly inefficient, where only 1% of the energy is converted to x-ray photons. The rest of the electrons' kinetic energy is converted to heat, deposited on the target, and eventually dissipated to the environment.

BRIEF DESCRIPTION

In one aspect, a multi-pixel x-ray source is provided. The x-ray source includes a plurality of transmission target assemblies. The transmission target assembly includes a tungsten target and a diamond substrate. The substrate includes a first transmission surface and a second transmission surface opposite first transmission surface. The substrate further includes a first side surface and a second side surface disposed between the first and second transmission surfaces. The target covers the first transmission surface of the substrate. The transmission target assembly further includes a base. The base surrounds the first and second side surfaces of substrate, exposing a collimator surface of the second transmission surface and the target. The transmission target assembly is configured to transmit x-ray generated by the target through the target and the substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings described below illustrate various aspects of the disclosure.

DETAILED DESCRIPTION OF THE INVENTION

The present disclosure is directed to a high brightness and high-efficiency x-ray source. The x-ray source may be used for tetrahedron beam computed tomography (TBCT). The present disclosure is based, at least in part on, a tungsten diamond or pyrolytic graphite laminated target. As shown herein, a W-diamond target configuration can be used to improve the tube power, such as by improving the focal spot power density. Further, a multiple-pixel x-ray source using a transmission target eases the geometry design of an x-ray tube and increases the tube power with multiple pixels.

Because of the inefficiency in the x-ray generation processes, a majority of electrons' kinetic energy is converted to heat. Heat management is therefore important in x-ray tube design to protect the x-ray generating target.

Figure 1:
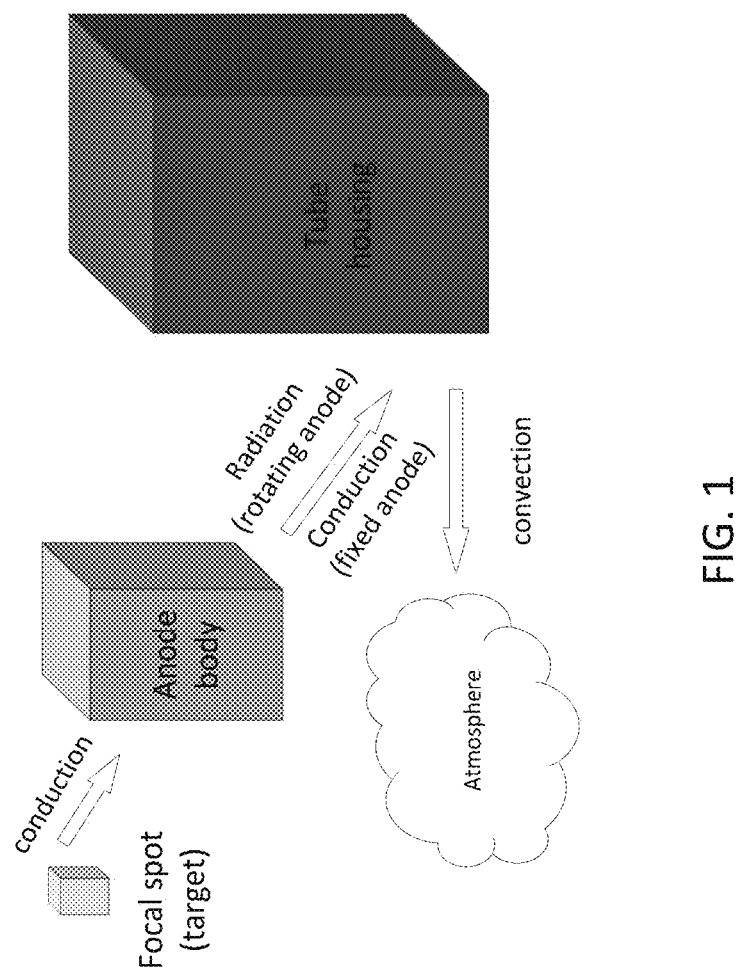
FIG. 1 shows the three key heat transfer steps in an x-ray tube.

FIG. 1 illustrates the three major steps of heat transfer in an x-ray tube. Electrons' kinetic energy is converted to heat at the focal spot, the location on the target where the electrons hit, when the high velocity electrons hit the target. The heat is conducted to the anode body that surrounds the target. The heat is then radiated if a rotating anode is used, or conducted if a fixed anode is used, to the housing of the x-ray generation tube or tube housing. The heat is then dissipated to the atmosphere through the tube housing.

With large amount of heat deposited on a small spot size, the maximum focal spot power density of x-ray tubes is about 0.5-1 kW/mm2, limited by the thermal conductivity of the target material, before the target melts. Modern x-ray tubes may have a peak power as high as 100 kW, thus thermal management is very challenging in the design of x-ray sources. Most x-ray tubes use a rotating anode to spread the heat from the small focal spot to a larger area. Even so, high power x-ray tubes still need a relatively large focal spot size to prevent the tungsten target from being damaged by the heat. A rotating anode used to manage heat does not work well for multi-pixel x-ray sources, because of the sources' elongated geometries. With the heat distributed to a plurality of focal spot positions, multi-pixel x-ray sources may use a fixed anode that may conduct the heat to outside the tube at a fast speed, however, the total area of focal spots is still limited.

Further, focal spot power density also affects image resolution. The image resolution of x-ray systems is determined jointly by focal spot size and detector pixel size. While current x-ray detector technology can fabricate detectors with very small pixel size, the focal spot size of x-ray sources remains at ~1 mm due to the limitation of focal spot power density, as described above. Image resolution is also important for CT, as well as for other x-ray imaging systems.

Besides image resolutions, x-ray tube focal spot power density also limits imaging speed, especially for x-ray scanners with fixed anode tubes, such as micro-focus and multi-pixel x-ray sources. Focal spot power density also limits CT imaging speed, especially for inverse-geometry CT15 and TBCT, where the multi-pixel x-ray sources use a fixed anode. Due to limited multi-pixel thermionic emission x-ray (MPTEX) tube output, slow rotating gantry machines, such as c-arm Linacs, are used in TBCT.

Limited focal spot power density imposes an even more significant constraint on phase-contrast CT and micro-focus x-ray sources that are used in small animal imaging platforms. In phase-contrast CT, a grating interferometer is often used to produce coherent x-ray beams. X-ray photons are largely blocked by the grating interferometer, thus a much higher flux is needed from x-ray sources in phase-contrast imaging. In micro-focus x-ray sources, the electron beam is focused to a tiny spot smaller than 100 μm for small animal imaging. Micro-focus x-ray sources also have to use a fixed anode due to the long scanning time.

Accordingly, limited focal spot power density of x-ray sources becomes a major roadblock in the further advancement of x-ray imaging technologies. The high output of MPTEX source with the anodes disclosed herein allows faster imaging speed and higher image resolution.

Due to engineering difficulties, multi-pixel x-ray sources have multiple targets that are spatially distributed. A multi-pixel x-ray source can also be referred to as a distributed x-ray source. A multi-pixel x-ray source uses a stationary reflecting anode. Unlike conventional x-ray tubes with a single focal spot, the heat of distributed x-ray source is distributed to a plurality of focal spot positions. The total area of focal spots is, however, still limited. A multi-pixel x-ray source operates in a pulse mode. The x-ray pixels are activated sequentially with a short dwell duration. Oosterkamp described the power limitation of the x-ray target as, $$P = \frac{\Delta T A}{2} \sqrt{\frac{\pi \lambda \rho c}{t}}, \quad (1)$$

where P is the electron beam power deposited in the focal spot, $\Delta T$ is the temperature rise, A is the focal spot area, t is the dwell duration, and $\lambda$, p and c are respectively the thermal conductivity, density, and specific heat of the target material. The maximum power allowed is inversely proportional to the square root of dwell duration.

By rotating the anode, the dwell duration of electrons reduces with increase in rotation speed of the anode. Development of multi-pixel x-ray sources with a rotating anode is challenging due to its elongated anode geometry. Multi-pixel x-ray sources can reduce dwell duration by increasing the scanning speed. The scanning speed, however, is limited by the imaging detector readout speed. For rotating anode x-ray sources, the anode rotates around the x-ray focal spot while the x-ray focal spot remains at the same position, and thus the detector integration time is independent of the anode rotation speed. For multi-pixel x-ray sources, the data of each x-ray pulse need to be differentiated as they represent sampling at different locations. The x-ray detectors used by CT scanners can be read out at about 10,000-20,000 samples per second, which limits the minimum dwell duration to about 50 μs for multi-pixel x-ray sources.

Enhanced thermal performance of the x-ray target material described herein is used to increase the focal spot power density. According to the Equation 1, the power of an x-ray source is proportional to the square root of the thermal conductivity of the target material, such as tungsten (W). Diamond has the highest thermal conductivity (2200 W/mK) among all known materials. But, because of the low-Z number of carbon atoms, diamond is inefficient in x-ray production. The two materials are combined to improve x-ray production. In one embodiment, a thin layer of tungsten is deposited or grown on the diamond substrate to improve x-ray production. Alternatively, diamond is grown on tungsten substrate. In some embodiments, chemical vapor deposition (CVD) techniques are used to achieve diamond thickness on the order of few mm with a high growth rate. The temperature of the substrate for growing diamond is kept above 700° C. to enhance the growth of diamond crystals and also suppress the growth of graphite. Tungsten is used as substrate materials where a localized carbide layer of a few nm is formed. Diamond crystals can be grown on diamond and non-diamond substrate like copper, gold, silicon or tungsten by chemical transport in a closed system. Substrates made of carbides such as SiC, WC and TiC are particularly suitable for diamond deposition. A pressure vapor deposition technique may be used to fabricate a W-diamond target.

Figure 2B:
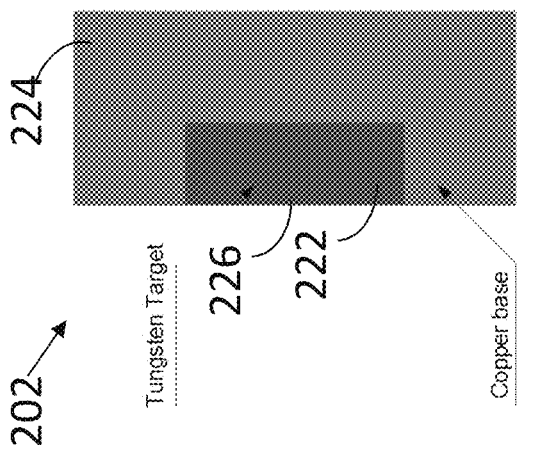
FIG. 2B shows a schematic diagram of the cross-section of a reflection target.
Figure 2A:
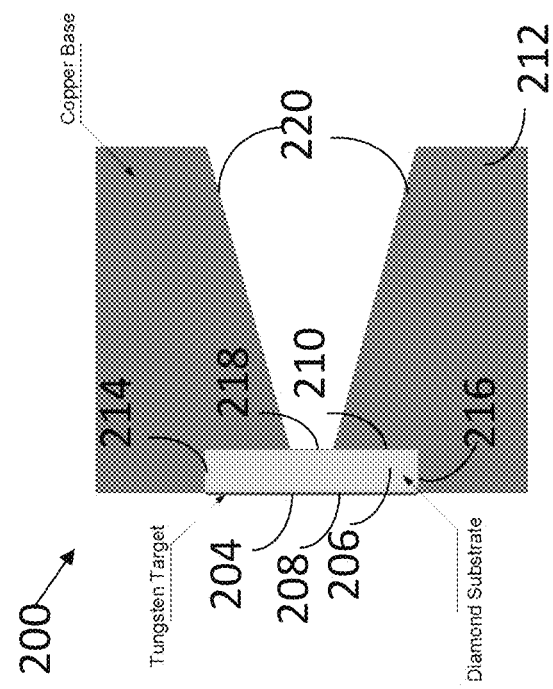
FIG. 2A shows a schematic diagram of the cross-section of a transmission target.

FIG. 2A illustrates a cross-sectional view of a transmission target assembly 200. Transmission target assembly 200 may correspond to a single x-ray source pixel in a multi-pixel x-ray source array. For comparison, a reflection target assembly 202 is shown in FIG. 2B. In transmission target assembly 200, x-rays pass through the target. In reflection target assembly 202, x-rays are reflected by the target.

In the exemplary embodiment, a transmission target assembly 200 comprises a target or transmission target 204 and a substrate 206. Target 204 may be made of tungsten. Substrate 206 may be made of diamond. Substrate 206 comprises a first transmission surface 208 and a second transmission surface 210 opposite first transmission surface 208. Substrate 206 further comprises a first side surface 214 and a second side surface 216. First and second side surfaces 214, 216 are disposed between first and second transmission surfaces 208, 210. Target 204 covers first transmission surface 208 of substrate 206. Transmission target assembly 200 further comprises a base 212. Base 212 may be made of copper. Base 212 surrounds first and second side surfaces 214, 216 of substrate 206, exposing a collimator surface 218 of second transmission surface 210 and target 204. Base 212 may form a collimator edge 220. Target 204 may be made of a thin tungsten layer deposited on a diamond substrate 206 brazed on a copper base 212. Generated x-rays are transmitted through target 204 and substrate 206, and further through collimator surface 218. Collimator edge 220 of base 212 forms a collimator and guide the generated x-ray into a fan or cone shape.

In comparison, reflection target assembly 202 comprises a reflection target or target 222 and a base 224. Base 224 surrounds all outer surfaces of target 222, except a reflection surface 226. Target 222 may be made of a thick tungsten slab embedded in copper base 224. The generated x-rays are reflected from target 226 and received by a detector.

A transmission x-ray target produces uniform x-ray beam intensity without producing "heel-effect" characteristic of a reflective target, where only fluence at a large angle can be used. It also allows more compact tube geometry, which is important for multi-pixel x-ray sources. The tungsten layer is thin enough such that the diamond target is used for transmission.

In one embodiment, transmission target assembly 200 comprises a thin tungsten film deposited on a ~2 mm thick diamond substrate brazed on a copper or graphite base. Diamond is stable at high temperature in vacuum environment. Its high thermal conductivity allows fast heat removal from target 204 and its low atomic number results in low x-ray attenuation and low Bremsstrahlung yield.

The copper base 212 of the transmission target 204 not only allows for fast heat removal from the target 204, but also collimates the beams into cone- or fan-shaped beams. Primary collimation close to the target allows a multi-pixel x-ray source with finer pixel spacing.

In the exemplary embodiment, the diamond transmission target is evaluated and optimized using Monte Carlo and finite element thermal simulations.

Monte Carlo (NIC) Simulations of Energy Deposition

In the exemplary embodiment, transmission target assembly 200 comprises a thin layer of tungsten (W) deposited on a diamond substrate. The thickness of W in the transmission target was optimized using Geant4 Monte Carlo (MC) simulations. A transient thermal model was built in a finite element analysis software. Finite element thermal simulations were performed to evaluate temperature distributions in the target under different power loadings. The maximum allowed power while keeping the target temperature below 3000° C. was determined for different pulse widths. The x-ray fluence and thermal performance of the transmission target were compared to that of a reflection target.

Electrons impinging on the target deposit their energy at various depths in the target. To model the energy deposition for the purpose of thermal analysis, MC simulations were performed using Geant4 simulation toolkit. Energy deposition of 80 keV, 100 keV and 120 keV electrons were obtained as a function of depth in tungsten.

Monte Carlo Simulation of X-Ray Fluence and Spectrum

Figures 3A, 3B:
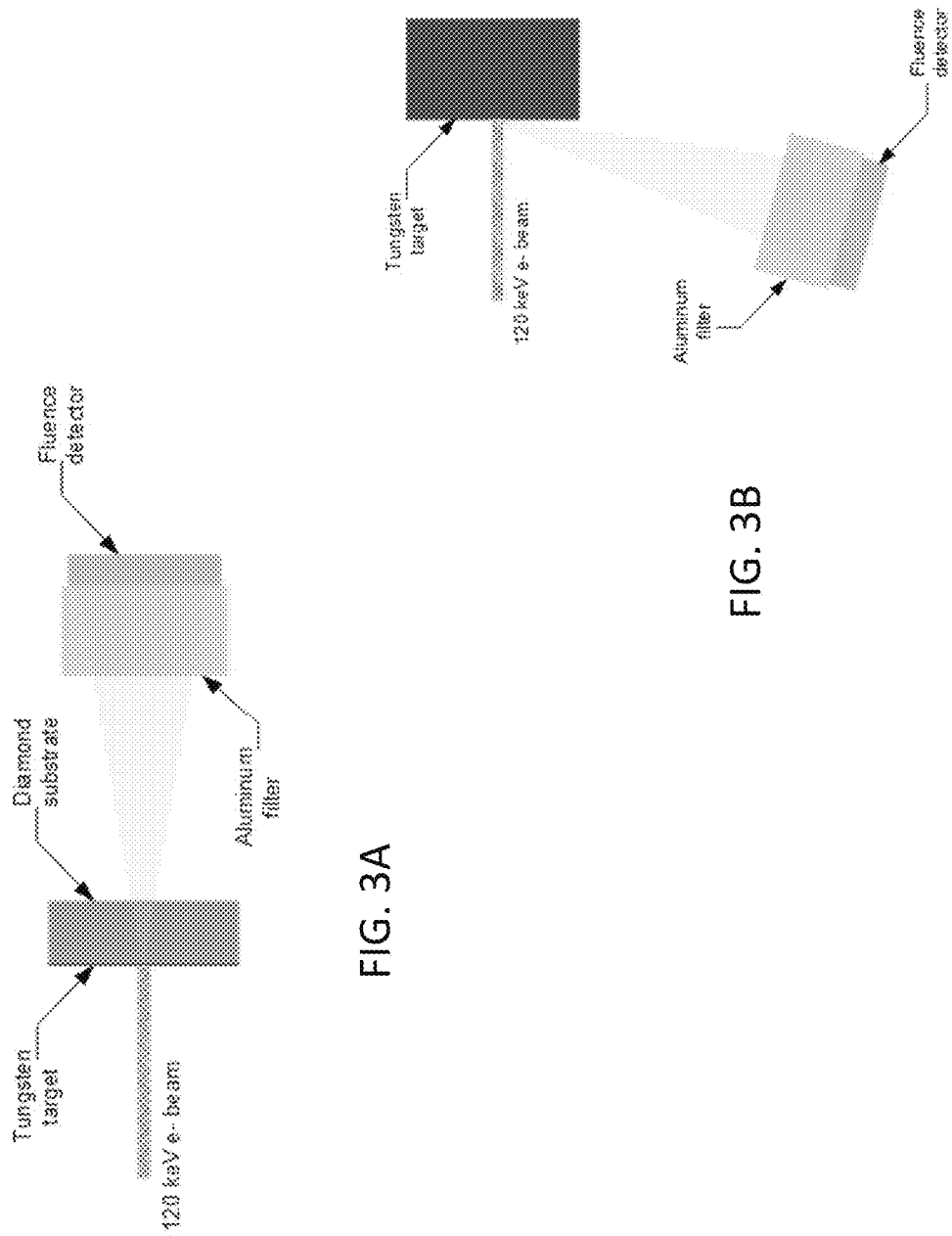
FIG. 3A shows a simulation model of x-ray generation using a transmission target.
FIG. 3B shows a simulation model of x-ray generation using a reflection target.

The geometrical model of a transmission target for the Geant4 MC simulation is shown in FIG. 3A. The MC model of x-ray source with a transmission target comprising a monoenergetic electron beam striking the tungsten-diamond composite target in a 1×1 mm$^2$ focal spot area perpendicularly. The x-ray fluence was recorded in a detector positioned at a distance of 3 cm from the focal spot. MC simulations were performed for different thicknesses of the tungsten target, while the thickness of diamond was kept at 2 mm.

For comparison, a reflection target was also modeled by MC simulation. FIG. 3B shows the model of the reflection target used in the Geant4 MC simulation. The x-ray fluence is scored for a 15° anode angle 3 cm away from the focal spot. Due to the anode angle, focal spot area is changed to 1×2 mm$^2$, for the reflection target model. For both reflection and transmission target models, a 3 mm aluminum (Al) layer was used as low-energy x-ray absorber to filter out the low energy photons that do not come out of the vacuum chamber of x-ray tube, to mimic filtration by vacuum envelope of an x-ray tube.

The x-ray fluence generated by the transmission target is expected to increase with the thickness of tungsten until all electrons are stopped. However, the self-absorption of tungsten target also increases with the thickness of tungsten. Thus, the x-ray fluence of the transmission target reaches a maximum at a particular thickness for a given electron beam energy. MC simulations were performed for electron energies in the range 40-140 keV and x-ray fluence for different thicknesses of tungsten target were calculated. On the other hand, the thickness of reflection target has no effect on x-ray fluence, therefore thickness of the reflection target was not changed, and only a 5 mm thick W target was modelled.

Finite Element Transient Thermal Simulation of Target Temperature

To evaluate the focal spot power density limitation, finite element thermal simulations were performed to study the focal spot temperature and heat dissipation rate. Finite element models of the W-diamond transmission target and W reflection target were built using a Multiphysics Finite Element Analysis (FEA) software. The FEA model of W-diamond target comprises a 5 µm tungsten target and 2 mm thick diamond substrate on a copper base as shown in FIG. 2A. The focal spot was modeled as a multilayer heating element with the power as a function of depth generated by the MC simulation. A focal spot area of 1×1 mm$^2$ was used in all the simulations of the transmission target. Only one-fourth of the actual volume was modeled because of the symmetry in the target geometry.

Temperature dependence of tungsten thermal conductivity and specific heat were included in the model. The temperature of the top and bottom surfaces were kept constant at 373 K as the boundary condition, assuming the tube is water cooled.

Transient thermal simulations were performed with different incident electron beam energies as the pulse-width varied from 50 µs to 3 ms. The resulting transient temperature distributions of the x-ray focal spot at different pulse widths and powers were calculated. The maximum allowed tube power while keeping the target temperature below 3000° C. for a given pulse duration were determined.

A 5-6 µm W layer of the transmission target is suitable for x-ray systems having peak kilovoltages (kVps) in the ranges of 60-140, which is commonly used for human imaging. Results indicated that the x-ray fluence of the transmission target can be 20-30% greater than that of reflected x-rays with electron beams at the same energy deposited onto the target. The W-diamond transmission target is able to achieve high power operation under short pulse loadings. The W-diamond target enables as much as a four-fold higher power or 8 times higher power density than the reflection target for the same temperature threshold.

Energy Deposition in the Target

Figure 4B:
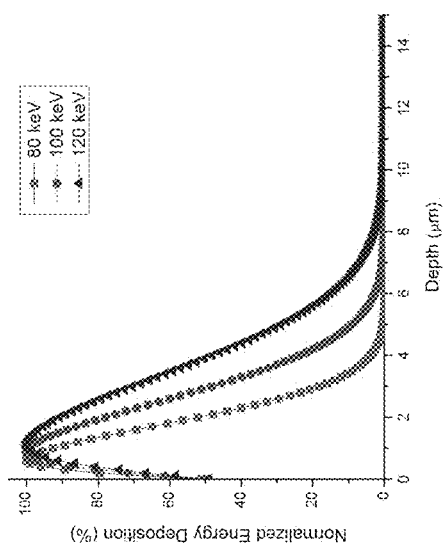
FIG. 4B shows simulation results of energy deposition as a function of depth for 80 keV, 100 keV and 120 keV electrons.
Figure 4A:
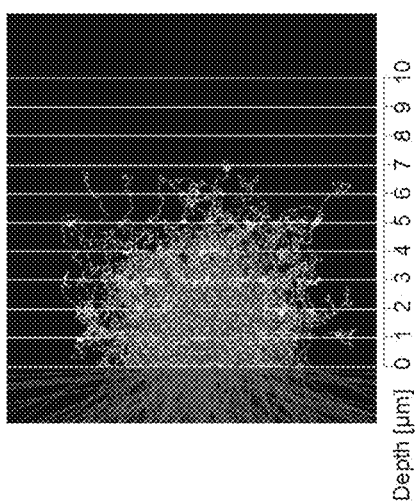
FIG. 4A shows simulated trajectories of 120 keV electrons in a transmission target.

The penetration of 80 keV, 100 keV and 120 keV electrons and their energy deposition as a function of depth in tungsten were modeled using the MC simulations described above. The results are shown in FIGS. 4A and 4B. FIG. 4A shows the trajectories of 120 keV electrons in a 10 µm tungsten target. FIG. 4B shows Geant4 MC simulation results of energy deposition as a function of depth for 80 keV, 100 keV and 120 keV electrons. The maximum depth of 120 keV electrons deposited in tungsten is less than 8 µm, which is about half of the continuous slow down approximation (CSDA) range (described in tungsten-pyrolytic graphite (W-PG) laminate target). Therefore, a thinner tungsten layer can be used for the target. Furthermore, as shown in FIG. 4B, most of the electron energy is deposited within the first few microns of the tungsten target material. The thickness of the tungsten layer can be further reduced.

Characteristics of X-Ray Beam Produced by W-Diamond Transmission Target

Figure 5B:
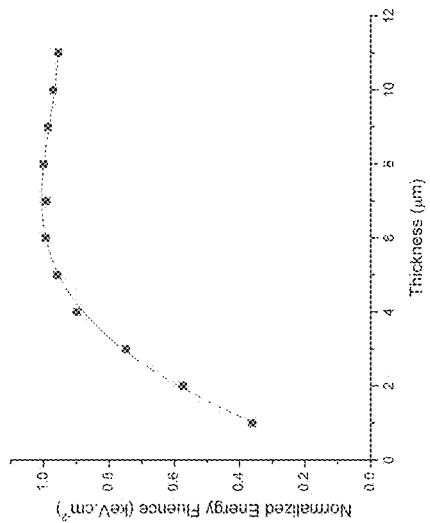
FIG. 5B shows energy fluence of transmission x-rays from a transmission target as a function of tungsten thickness with electron beam energy at 120 keV.
Figure 5A:
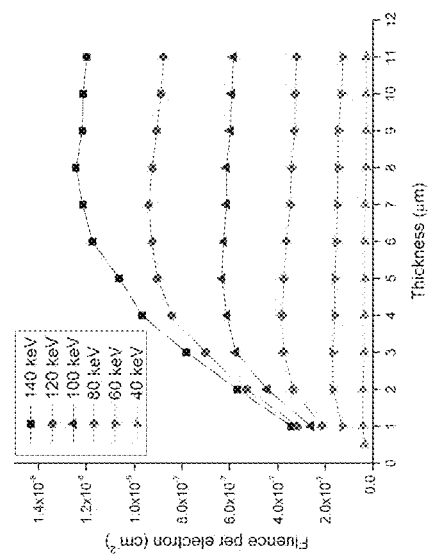
FIG. 5A shows transmission x-ray fluence from a transmission target as a function of tungsten thickness with different electron beam energies.

FIGS. 5A and 5B plot x-ray fluence and energy fluence produced by W-diamond transmission target as a function of tungsten thickness. FIG. 5A shows transmission x-ray fluence from the W-diamond target as a function of tungsten thickness recorded for different electron beam energies. FIG. 5B shows energy fluence of transmission x-rays from the W-diamond target as a function of tungsten thickness recorded for 120 keV electron beam energy. The Aluminum filtration removes low energy x-ray photons that would not come out of the vacuum envelope. x-ray fluence first increases to a maximum point and then decreases due to self-absorption by the tungsten target material. The energy fluence follows the same trend.

Figure 6:
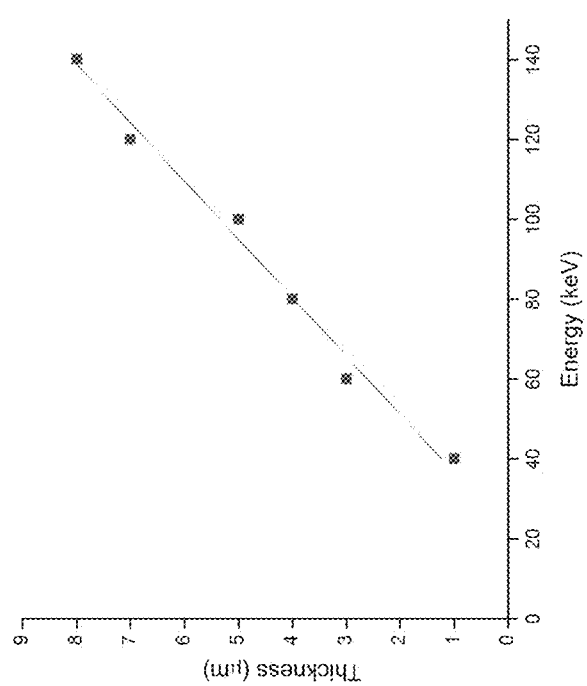
FIG. 6 shows optimal thickness of the tungsten (W) layer in a transmission target as a function of electron energy.

FIG. 6 shows the thicknesses of tungsten layer that produces maximum x-ray fluence for different beam energies. The optimal thickness increases approximately linearly with electron energy.

Figure 7:
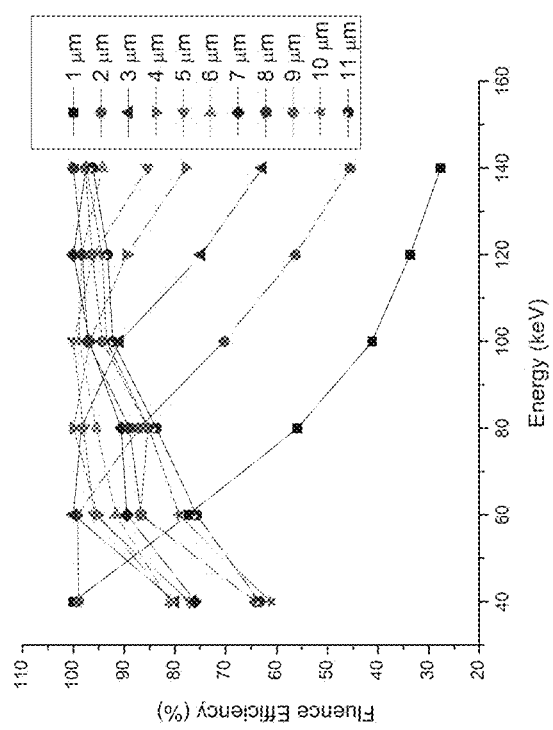
FIG. 7 shows fluence efficiency of transmission targets having tungsten thicknesses from 1 μm to 11 μm as a function of electron beam energies.

An x-ray system may use different kVp settings in clinical imaging based on the size of the subjects. The kVp setting used for imaging humans usually ranges from 60 kVp to 140 kVp. The efficiencies of 1-11 µm tungsten targets for transmission fluence were evaluated at different electron energies and the results are shown in FIG. 7. 100% efficiency is defined as when the x-ray fluence is maximized for a given energy. The tungsten thickness of about 5-6 µm appears to be acceptable for the beam energy in the range of 60-140 keV, where the x-ray fluence remains above 80% of its maximum value.

Figure 8:
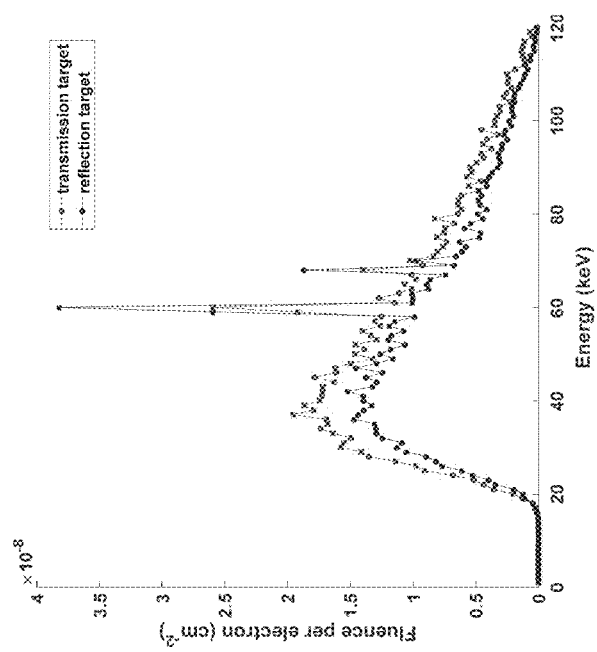
FIG. 8 shows x-ray spectra of a 5 μm thick transmission target and a 5 mm thick reflection target as a function of energy.

FIG. 8 shows the comparison of the photon spectra produced by bombarding 120 keV electrons on a 5 µm W-diamond transmission and on a 5 mm thick reflection targets. Both x-ray beams are filtered by a 3 mm aluminum filter. The results indicate that the Bremsstrahlung component of the transmission targets is about 20% higher than the reflection target. However, the characteristic x-ray spikes of the transmission target are significantly lower than that of the reflection target. The lower characteristic x-ray component can be attributed to the energy threshold of characteristic x-ray generation. Characteristic x-rays are generated only in the first few microns of tungsten, after which the electrons lose their kinetic energy to produce characteristic x-rays. Thus, although the total numbers of characteristic x-ray photons are the same in transmission and reflection targets, the characteristic x-ray photons are absorbed more in transmission target as they need to pass through more tungsten layers. Nevertheless, the total integral fluence of high energy x-rays is still higher for the transmission target despite the additional 2 mm diamond filter.

Figure 9:
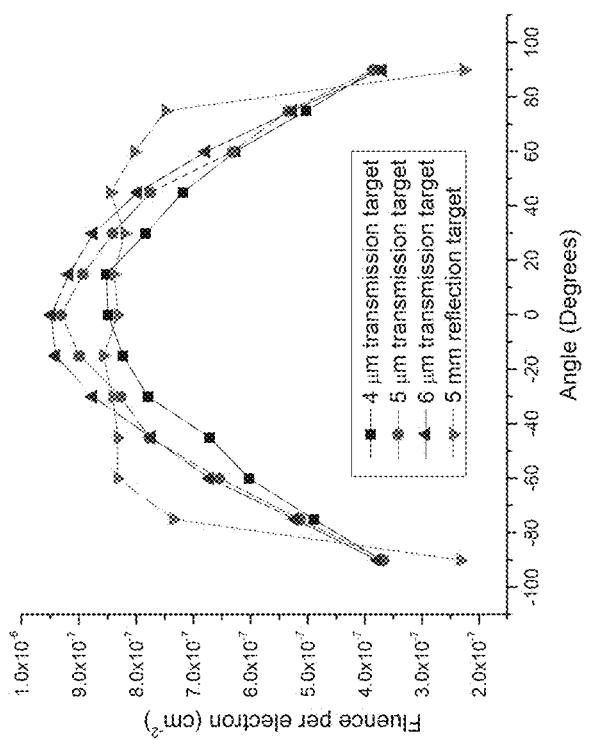
FIG. 9 shows x-ray fluence profiles from transmission targets having different thicknesses and x-ray fluence profile of a reflection target, where the electron beam energy is at 120 keV.

FIG. 9 shows x-ray fluence profiles as a function of the angle between the x-ray and the target surface. The fluence is more uniform for reflection target than transmission target. However, the fluence of the reflection target at the central axis cannot be utilized. X-ray tubes with a reflection target usually have a small anode angle. Thus only the fluence at large angle in FIG. 9 is used, which is called a heel effect. Transmission target, on the other hand, can utilize the photons in central axis where the fluence is maximal. Although the flat region of the fluence for a transmission target is smaller compared with a reflection target, this would not pose as a problem for x-ray imaging as only a small angular window is used in x-ray systems using a reflection target. The results indicate that, for a 120 kVp beam, the W-diamond transmission target with a 5-6 µm W target can produce approximately 20% higher fluence than reflection target of the same tube power.

Transient Thermal Simulations

Figure 10A:
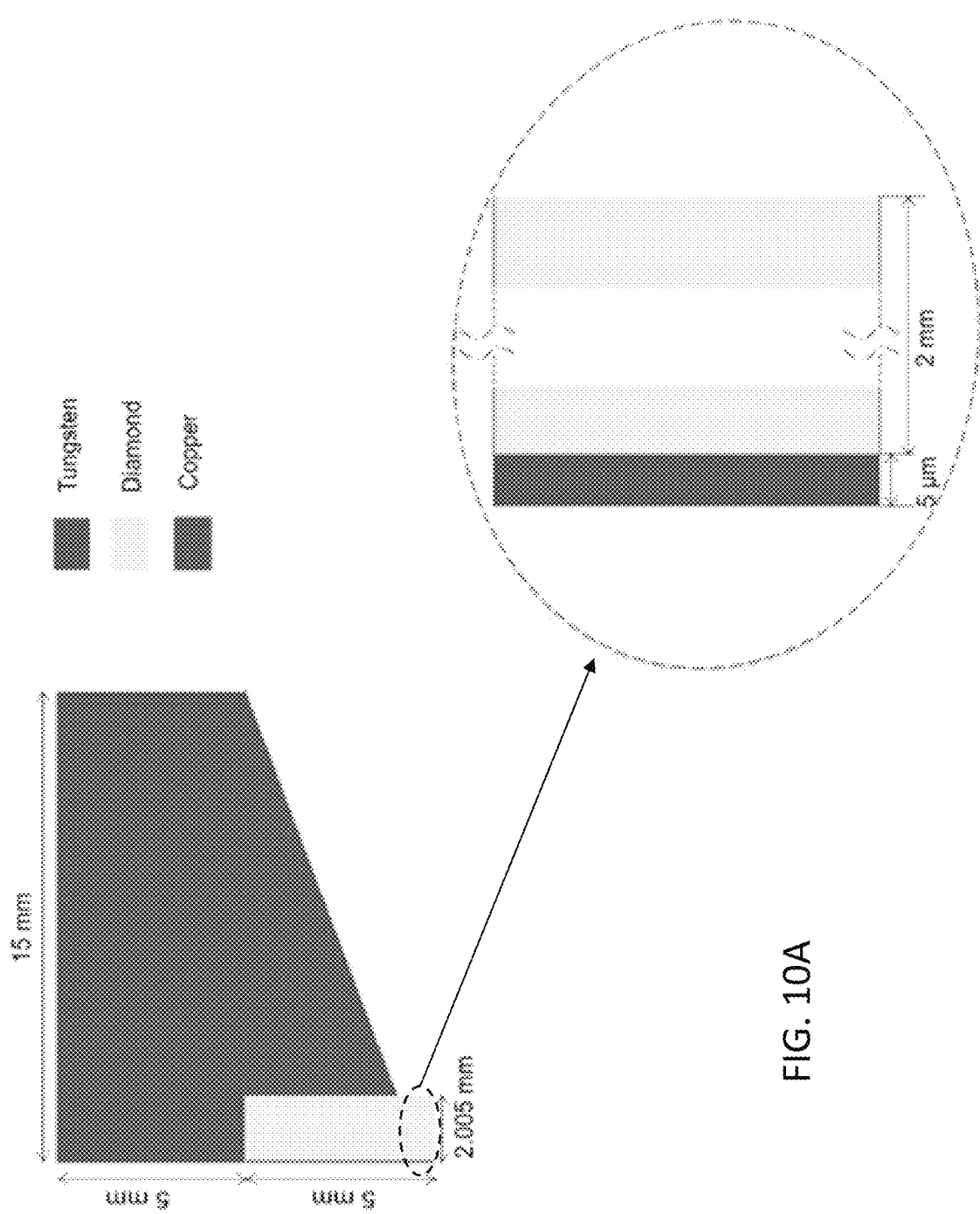
FIG. 10A is a schematic diagram of the transmission target model used in the simulations.
Figure 10B:
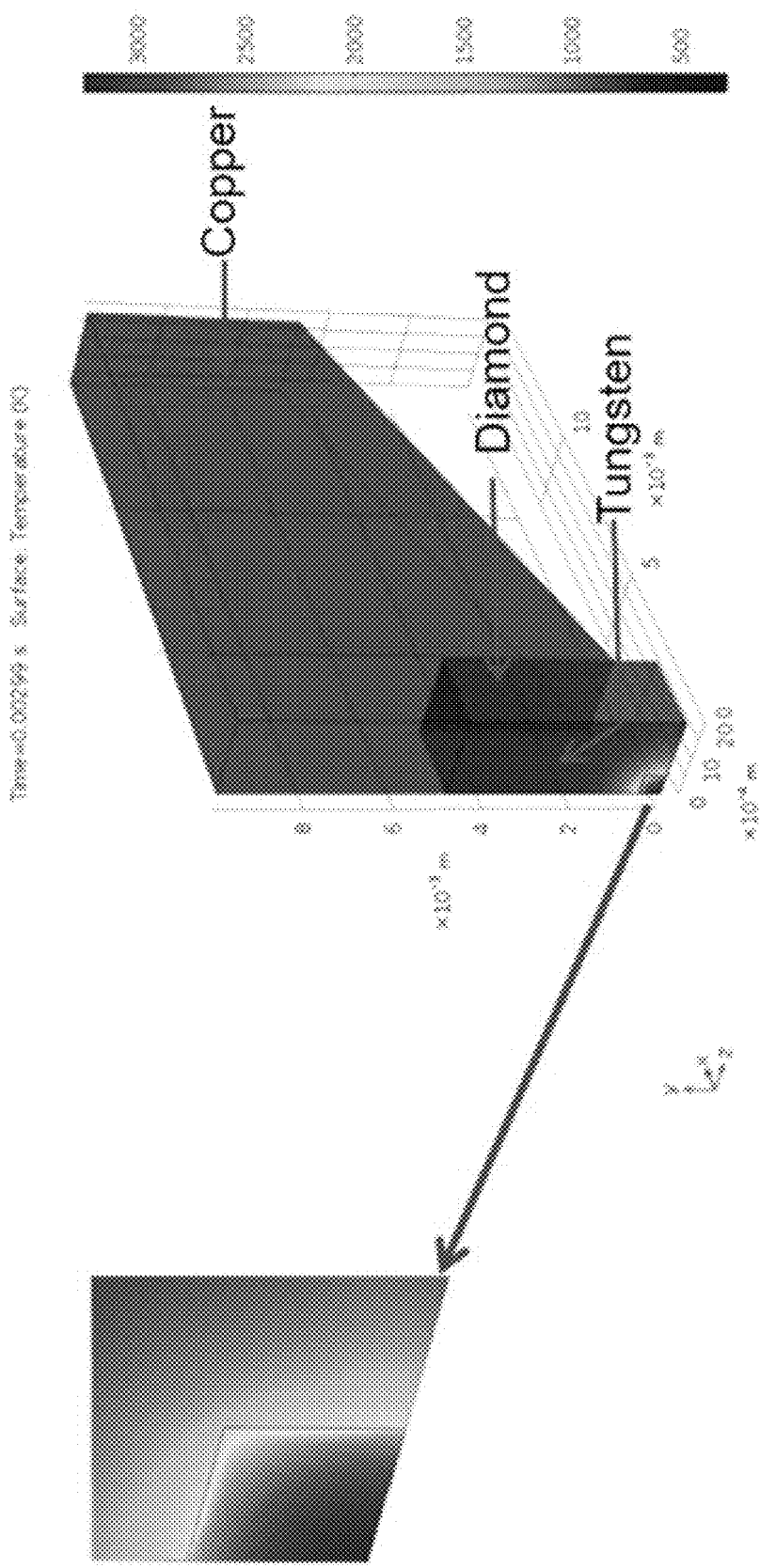
FIG. 10B shows simulated temperature distribution near the focal spot on the W-diamond transmission target shown in FIG. 10A, where a 3 ms, 11 kW beam is used in the simulations.
Figure 10C:
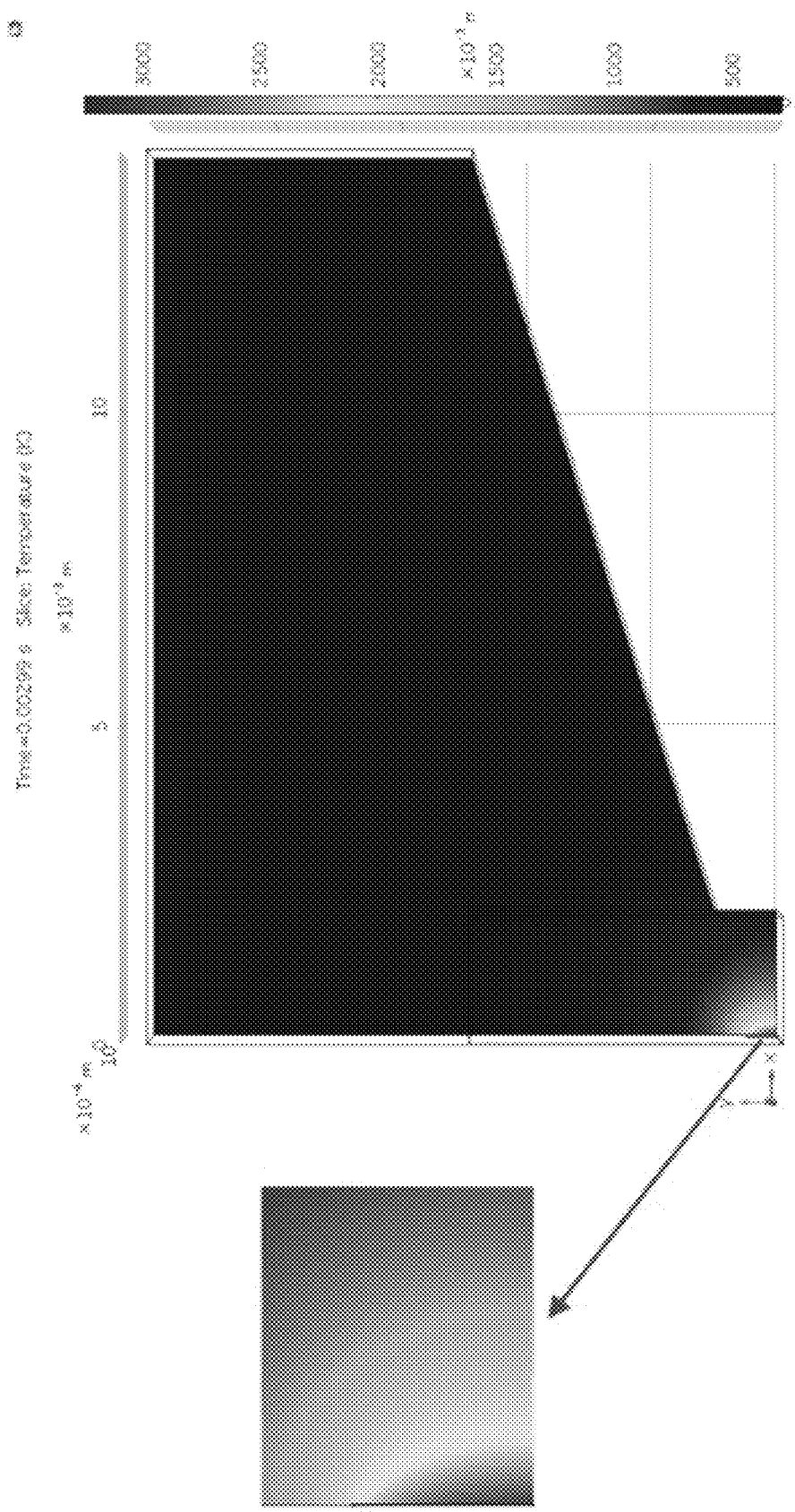
FIG. 10C shows simulated temperature distribution in the x-y plane of the target shown in FIG. 10A with a 3 ms, 11 kW beam.

In transient thermal analysis, the focal spot was modeled as laminated heating elements. The power of each heating element layer was assigned as a function of depths based on the MC results above. The finite element contains only ¼ of the anode to take advantage of the symmetry of the geometry. FIGS. 10A-10C show the temperature distribution of the transmission target caused by a 3 ms pulse of 11 kW power (120 kV and 91.7 mA). Enlarged views of the plots (pointed by the arrows) are also included FIGS. 10A-10C. FIG. 10A shows a schematic diagram of the transmission target model used in FEA simulations. The FEA model includes ¼ of the transmission target, taking advantage of geometric symmetry of the target. FIG. 10B shows temperature distribution near the focal spot on the W-diamond transmission target surface caused by a 3 ms, 11 kW beam calculated using a FEA simulation. FIG. 10C shows temperature distribution in the x-y plane of the target caused by a 3 ms, 11 kW beam. The maximum temperature is observed at the center of the focal spot as expected. The temperature decreases quickly outside the focal spot and the gradient is very slow in the copper base.

Figures 11A, 11B:
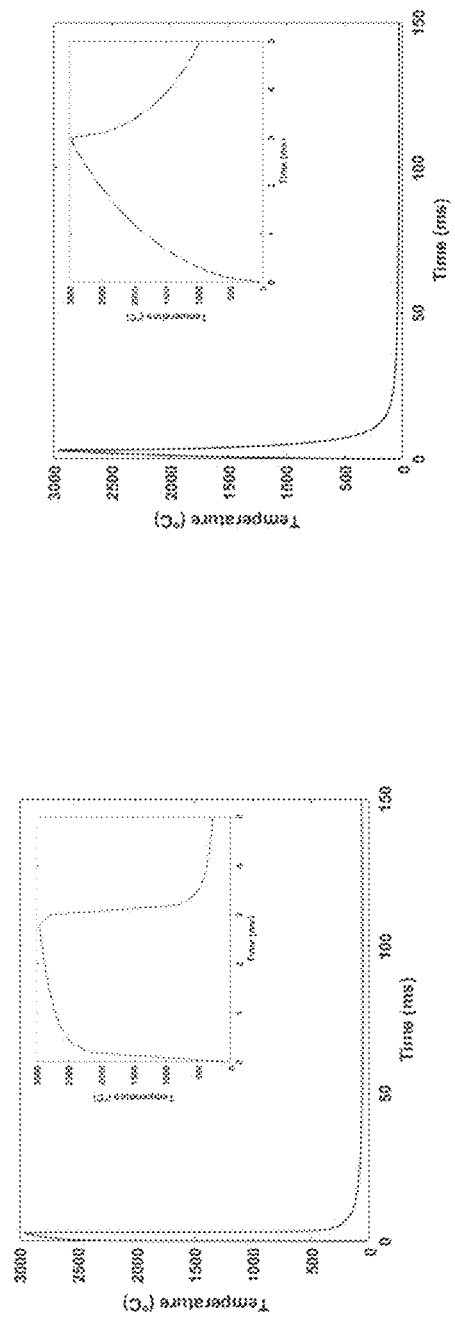
FIG. 11A shows variation of the maximum focal spot temperatures versus time for a transmission target.
FIG. 11B shows variation of the maximum focal spot temperatures versus time for a reflection target.

FIGS. 11A and 11B show the temperature history of the focal spots for W-diamond transmission and W reflection targets, respectively. FIGS. 11A and 11B shows variation of the maximum focal spot temperatures with time with a 3 ms pulse (2% duty cycle) of (a) 11 kW electron beam power for the transmission target (FIG. 11A) and (b) 1.9 kW electron beam power for the reflection target (FIG. 11B). The inserts in FIGS. 11A and 11B show enlarged plots of focal spot temperatures during the time interval of 0-5 ms. The focal spot size of the transmission target and reflection target are 1×1 mm$^2$ and 1×2 mm$^2$ respectively. For the transmission target, the focal spot temperature rises very fast from 20° C. to 2500° C. during the first 0.5 ms, and to 3000° C. in 3 ms. When the electron beam is turned off, the temperature drops rapidly to 280° C. in 5 ms. At the end of the 150 ms pulse cycle (assuming a pulse repetition rate of 6.67 Hz), i.e., before the start of next pulse, the temperature drops to 67° C. The results indicate that pulse mode operation of the tube enables faster dissipation of heat with low duty cycle. Therefore, the beam power allowable during the pulse duration may be kept significantly high for short pulse widths. For the reflection target, the temperature curves rise continuously and do not result in a plateau compared to the W-diamond transmission target. Focal spot temperature also decreases rapidly within 150 ms. But note the power of the electron beam is at 1.9 kW, much lower than the power for the transmission target.

To keep the W-diamond target temperature spike below 3000° C., the maximum power allowed for different pulse widths were obtained and shown in FIG. 12. The maximum power is greatly affected by the pulse width. When the pulse width increases from 50 μs to 3 ms, the maximum power is reduced from 22 kW to 11 kW. Accordingly, in order to achieve high tube output, x-ray sources with stationary anode should operate with short pulse widths. The simulation also shows more than 22 kW peak power may be achievable for pulse widths smaller than 50 μs.

Figure 12:
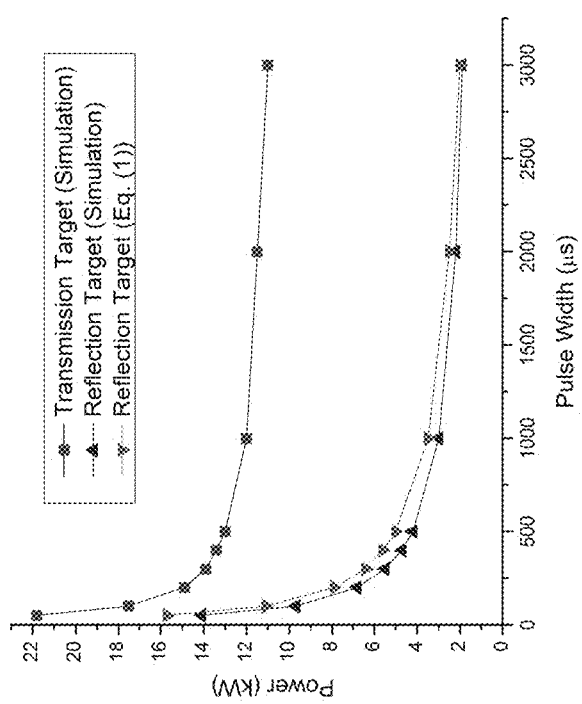
FIG. 12 shows maximum electron beam power as a function of pulse width for a transmission target and a reflection target.

For comparison, the same study was also performed for a 5 mm thick reflection W target with focal spot size of 1×2 mm$^2$ (the blue line in FIG. 12). The reflection target exhibits a similar trend, where the maximum power reduced as the pulse width increases. However, the maximum beam power loading is only 14 kW at 50 μs, compared to 22 kW for a W-diamond target. The difference in maximum power is even larger for longer pulses. When the pulse width is longer than 1 ms, the maximum power of W-diamond transmission target can be four times higher than the reflection target. FIG. 12 also shows the maximum power calculated using Eq. (1) (the green line), which is valid for a thick target. The simulation and analytical calculation results for reflection target are consistent with each other. Slight deviation may be due to the nonlinear thermal conductivity and specific heat used in the simulation model.

The focal spot power density of multi-pixel x-ray sources was simulated by using a W-diamond transmission target. The transmission target design results in advantage over a reflection target. A transmission target can simplify the geometry of an x-ray tube as the x-ray beams are generated on the opposite side of the cathodes. On the other hand, the x-ray beams from the reflection targets come out between the cathode and the anode, where the space is usually very limited, thereby limiting the maximum field size. There are significant amount of electrons scattered back to the vacuum after bombarding the target. Back-scatter electrons carry large amount of energy and may add a long tail to the focal spot when they return to strike the target again. In transmission target, the x-ray generated by back-scattered electrons are largely absorbed by the target and blocked by the anode body.

The optimal thickness of the tungsten layer of W-diamond target is linearly proportional to the electron energy. A transmission target having approximately 5-6 μm thick tungsten may have the best x-ray production efficiency for the energy range of 60-140 kVp. Based on the simulation calculation results, the W-diamond transmission target may produce about 20% more x-ray fluence for the same power compared with a reflection target. The maximum power that keeps focal spot temperature under melting point is strongly dependent on the pulse duration. For a pulse of a few ms, the power allowed by a W-diamond transmission target can be four-fold higher than a reflection target. Thus, it may allow significant improvement on the output of multi-pixel x-ray sources. For example, the power density limit of the 1 mm×1 mm focal spot when the source operates with 50 μs pulses is as high as 22 kW/mm$^2$. Even though the physical focal spot size of a reflection target is larger than the projected focal spot due to the anode angle, a transmission target can still achieve up to four times higher power despite its focal spot area is only half of that of the reflection target.

In another embodiment, a tungsten pyrolytic graphite (W-PG) laminated target is provided. Due to its high melting point (3422° C.) and high atomic number (74), tungsten is a choice for x-ray source target material. But its relatively low thermal conductivity (173·W·m$^{-1}$·K$^{-1}$) significantly limits focal spot power density of x-ray sources. The maximum depth of 120 keV electrons deposited in tungsten is ~10 μm, thus a large amount of heat is deposited to a very thin layer of tungsten. Because of limited heat removal rates, the heat is built up quickly in the target and may melt the tungsten if the tube power is too high. To improve the tube output, the target needs to have a higher thermal conductivity. Pyrolytic graphite (PG) is multiple layers of graphene sheets bonded together by covalent bonding. PG, especially annealed pyrolytic graphite (APG), has an exceptional high thermal conductivity of up to 1700·W·m$^{-1}$·K$^{-1}$ along its a-b plane, nearly 10 times higher than that of tungsten at room temperature. Similar to graphite, APG is also very refractory and can withstand up to 4000° C. in vacuum before melting, exceeding tungsten's melting point. Bremsstrahlung x-ray production efficiency is proportional to target atomic number. The low Z number of carbon makes APG unsuitable as x-ray target material by itself. Nevertheless, by laminating W on APG, the high z number of W and high thermal conductivity of APG can be used to develop a novel composite anode that overcomes limitation of focal spot power density of tungsten targets.

Figure 13A:
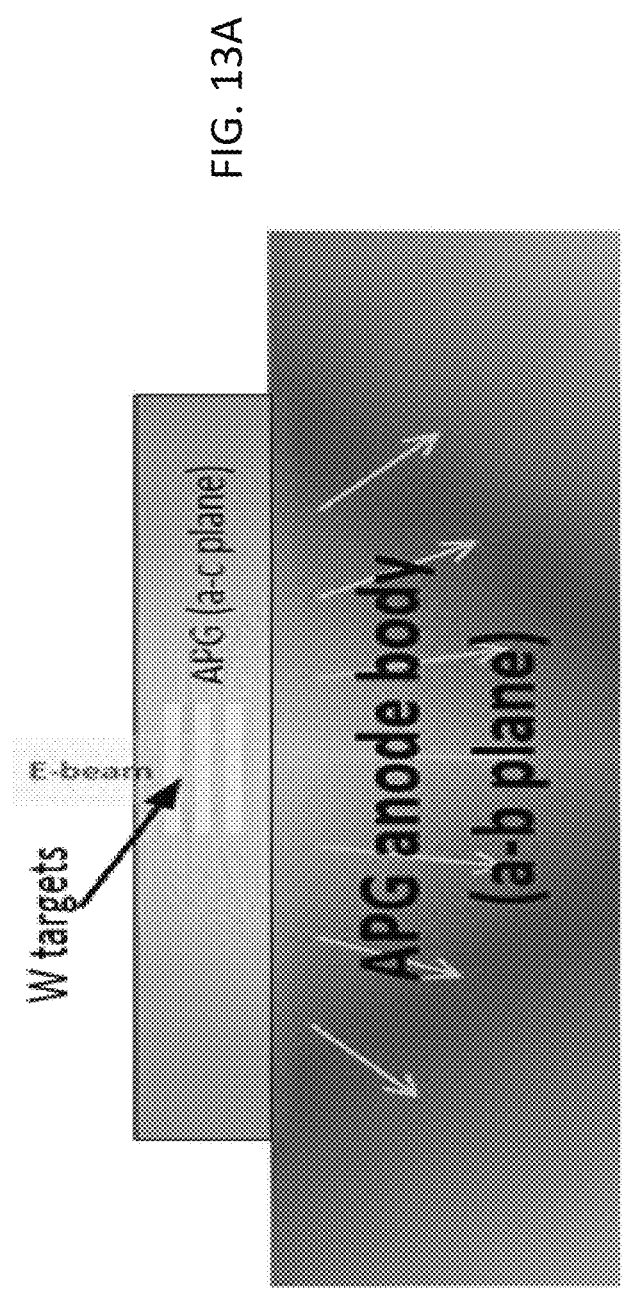
FIG. 13A shows a schematic diagram of a tungsten-annealed pyrolytic graphite (W-APG) laminate target on an annealed pyrolytic graphite (APG) anode base.
Figure 13B:
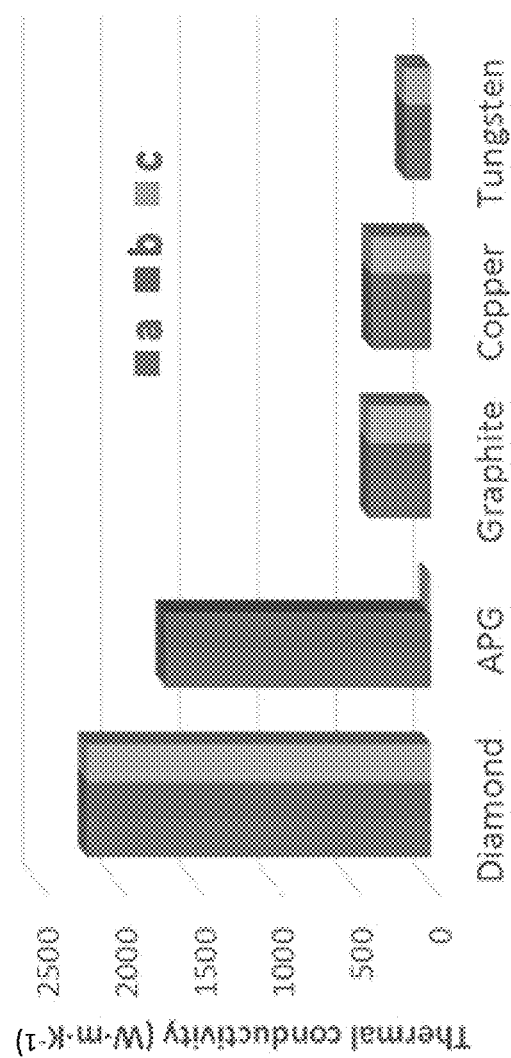
FIG. 13B shows the thermal conductivity of APG compared to other materials.

A W-PG laminate target for MPTEX source as shown in FIG. 13A is in accordance with one embodiment of the disclosure. FIG. 13A shows a W-APG laminated target positioned on an APG anode base (FIG. 13A is not in scale). FIG. 13B shows thermal conductivity of APG compared to other target materials. a, b, and c are the crystallographic axes of the material. The thermal conductivity of APG in the a-b plane is more than ten times higher than W and, as a result, APG rapidly removes head inside the target. The APG anode body further conducts heat to the tube housing. The thicknesses of APG and W layers are controlled such that the heat is evenly divided by multiple W layers. The APG layers embedded between W targets quickly remove the heat due to their outstanding thermal conductivity.

An APG anode body with its thermal conductive a-b plane aligned with the heat conduction direction is also disclosed herein. Finite element simulation suggests that a 2-5 times increase of the focal spot power density is possible with the new composite anode (see Example 1 below). The new anode fabrication technique disclosed herein can be used in multi-pixel sources as well as single focal spot x-ray sources.

A novel target fabrication technique is disclosed herein to overcome the limitations described above, and to enhance the performances of x-ray sources. The described target fabrication technique includes lamination of W-PG targets and production of an APG anode base.

Lamination of W-PG target: Electron kinetic energy is deposited to a very thin layer (~10 μm) of a tungsten target. PG and W layers are laminated such that the total heat is divided to multiple targets at different depths. The thermal conductive APG layers embedded between the targets remove the heat rapidly due to its exceptional high thermal conductivity. This innovative W-PG laminate target dramatically increases the focal spot power density allowed.

APG anode base: Graphite brazed with a tungsten layer is a common configuration for x-ray tube anodes. As shown in FIG. 13B, the thermal conductivity in the a-b plane of annealed pyrolytic graphite (APG) is 3-4 times higher than regular graphite. APG has been employed in high-end electronics and aerospace that requires extreme cooling performance, but has never been employed in x-ray tube anodes. In multi-pixel x-ray sources, the heat is conducted primarily within the cross-section plane. When aligning APG's a-b plane with the tube cross section, the extreme cooling performance of APG can significantly improve the cooling rate of multi-pixel x-ray sources. A rotating anode may also employ this technique with embedded thermal vias to pass the heat to different APG layers.

Figure 18:
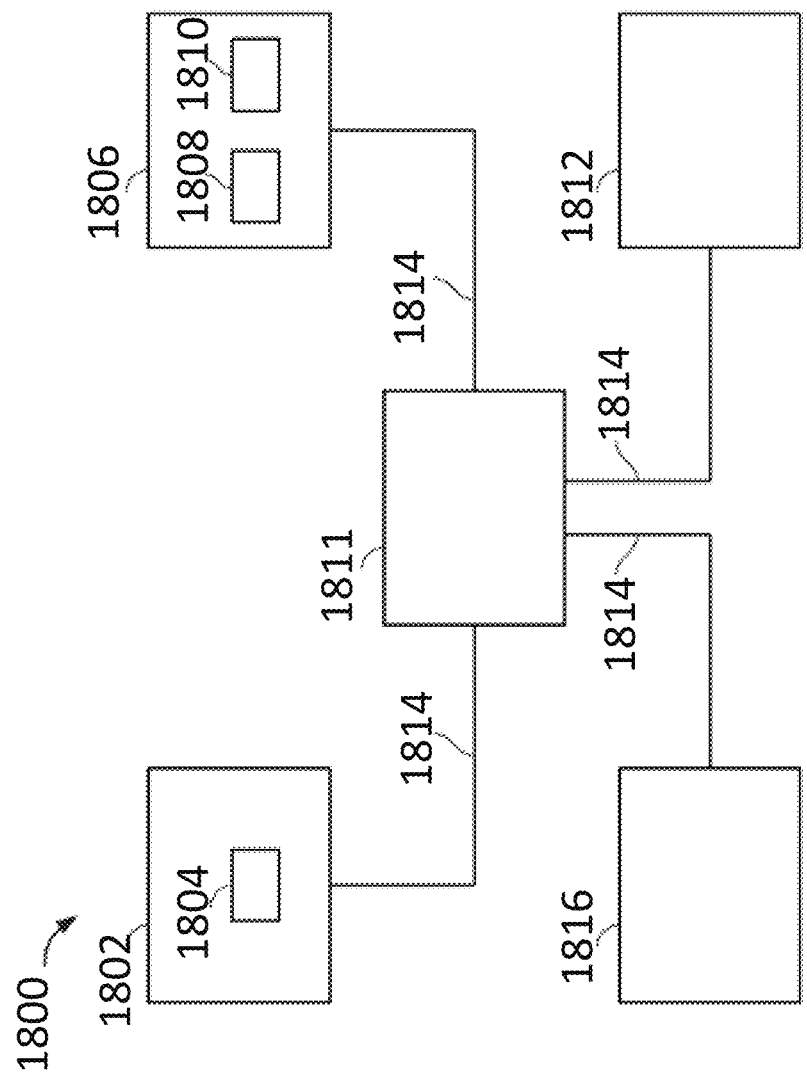
FIG. 18 shows a block diagram illustrating a computing device in accordance with an aspect of the disclosure.

Methods disclosed herein may be implemented on a computing device. FIG. 18 is a block diagram of a computing device 1800. In the exemplary embodiment, computing device 1800 includes a user interface 1802 that receives at least one input from a user. User interface 1802 may include a keyboard 1804 that enables the user to input pertinent information. User interface 1802 may also include, for example, a pointing device, a mouse, a stylus, a touch sensitive panel (e.g., a touch pad, a touch screen), a gyroscope, an accelerometer, a position detector, and/or an audio input interface (e.g., including a microphone).

Moreover, in the exemplary embodiment, computing device 1800 includes a presentation interface 1806 that presents information, such as input events and/or validation results, to the user. Presentation interface 1806 may also include a display adapter 1808 that is coupled to at least one display device 1810. More specifically, in the exemplary embodiment, display device 1810 may be a visual display device, such as a cathode ray tube (CRT), a liquid crystal display (LCD), an organic LED (OLED) display, and/or an "electronic ink" display. Alternatively, presentation interface 1806 may include an audio output device (e.g., an audio adapter and/or a speaker) and/or a printer.

Computing device 1800 also includes a processor 1811 and a memory device 1812. Processor 1811 is coupled to user interface 1802, presentation interface 1806, and to memory device 1812 via a system bus 1814. In the exemplary embodiment, processor 1811 communicates with the user, such as by prompting the user via presentation interface 1806 and/or by receiving user inputs via user interface 1802. The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 1812 includes one or more devices that enable information, such as executable instructions and/or other data, to be stored and retrieved. Moreover, memory device 1812 includes one or more computer readable media, such as, without limitation, dynamic random access memory (DRAM), static random access memory (SRAM), a solid state disk, and/or a hard disk. In the exemplary embodiment, memory device 1812 stores, without limitation, application source code, application object code, configuration data, additional input events, application states, assertion statements, validation results, and/or any other type of data. Computing device 1800, in the exemplary embodiment, may also include a communication interface 1816 that is coupled to processor 1811 via system bus 1814.

In the exemplary embodiment, processor 1811 may be programmed by encoding an operation using one or more executable instructions and providing the executable instructions in memory device 1812. In the exemplary embodiment, processor 1811 is programmed to select a model provided by a user.

In operation, a computer executes computer-executable instructions embodied in one or more computer-executable components stored on one or more computer-readable media to implement aspects of the invention described and/or illustrated herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

EXAMPLES

Example 1: Evaluation of the Multi-Pixel Thermionic Emission X-Ray Source (MPTEX)

Figure 14A:
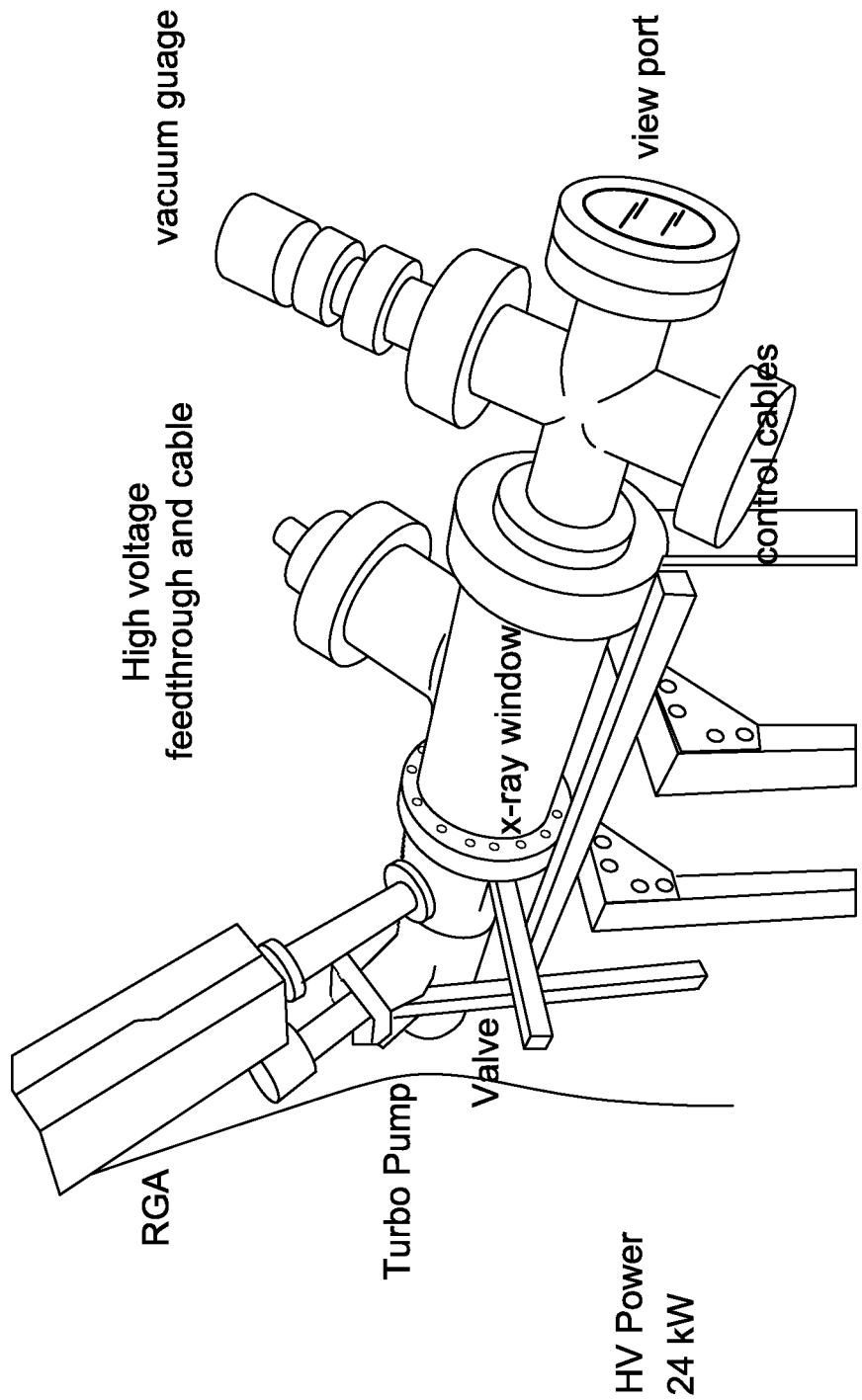
FIG. 14A shows an exemplary multi-pixel thermionic emission x-ray (MPTEX) prototype.
Figure 14B:
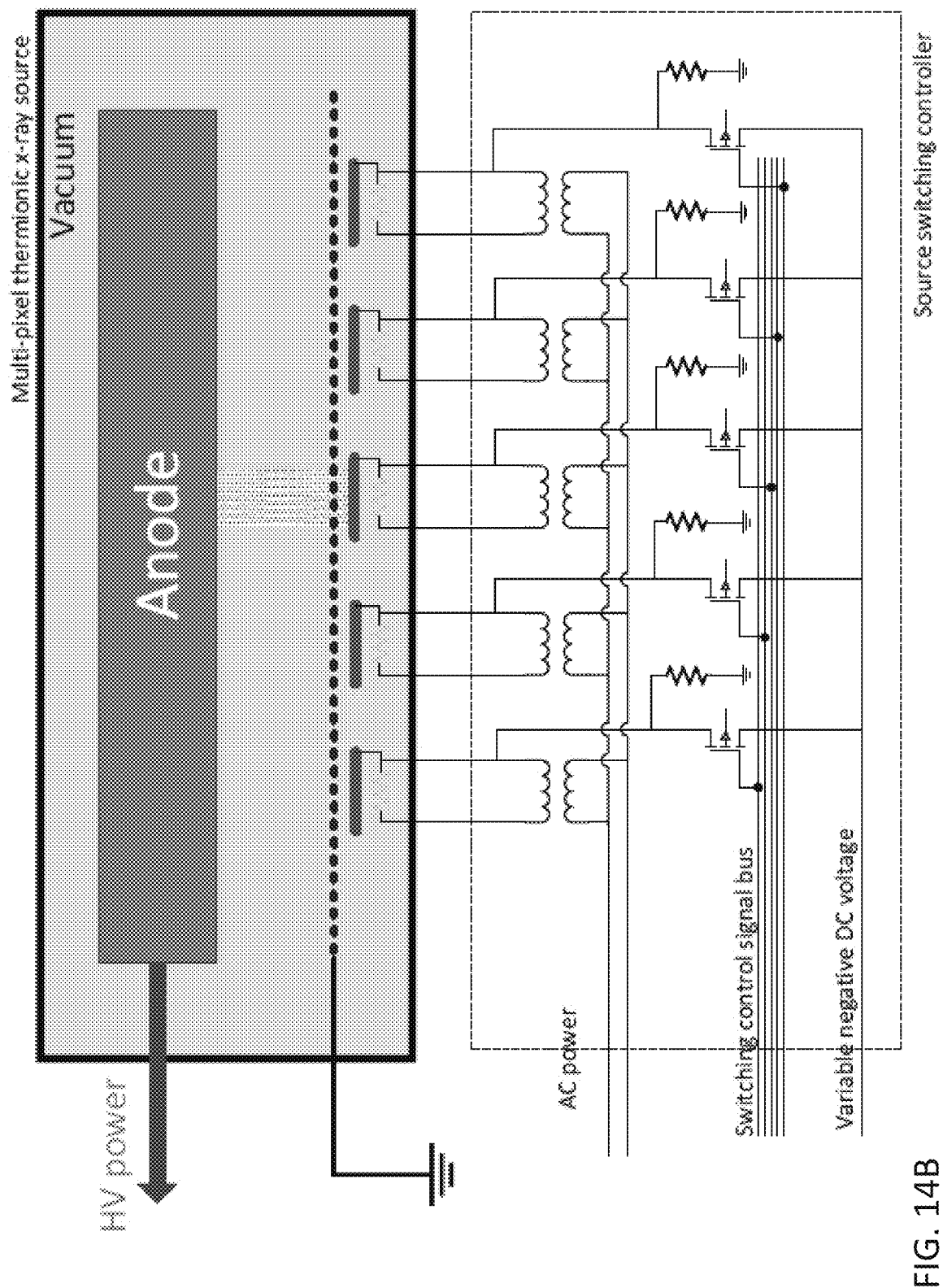
FIG. 14B shows a functional diagram of the prototype shown in FIG. 14A.

This Example describes the development of a multi-pixel thermionic emission x-ray source (MPTEX) prototype, and the evaluation of the performance of the prototype.
Methods and Materials Multi-pixel thermionic emission x-ray source (MPTEX): An MPTEX source prototype for TBCT applications is developed. The tube is made of aluminum body with Con-Flat flanges. Water cooling pipes are embedded in the aluminum tube body for fast heat removal. The anode is made from a graphite bar brazed with a 5 mm thick tungsten target. FIGS. 14A and 14B show the MPTEX prototype and its functional diagram. The tube can contain up to 48 thermionic cathodes in a 4 mm spatial spacing and each cathode may produce the same numbers of focal spots. Both oxide coated and dispenser cathodes that can produce 100 mA and 500 mA cathode current respectively are evaluated. The tube is able to operate at 100 kVp limited by the anode high voltage vacuum feedthrough. X-ray measurement shows the target physical focal spot size is about 2 mm² and projected focal spot is under 1 mm² with anode angle. In some embodiments, the tube current is limited under 100 mA and the dwell duration under 50 μs due to the limitation of focal spot power density.

Finite element analysis (FEA) thermal simulation: To evaluate the performance of the anode, the heat distributions were simulated using a thermal finite element simulation software. Additionally, the maximum power allowed was estimated by increasing the focal spot power until the maximum temperature reaches about 3000° C.

Results

Figure 15C:
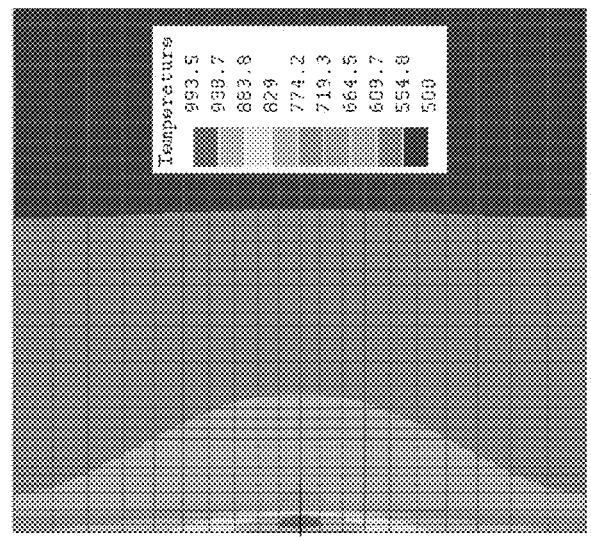
FIG. 15C shows temperature distributions of a dual layer W-PG target with the PG having a high thermal conductivity.
Figure 15B:
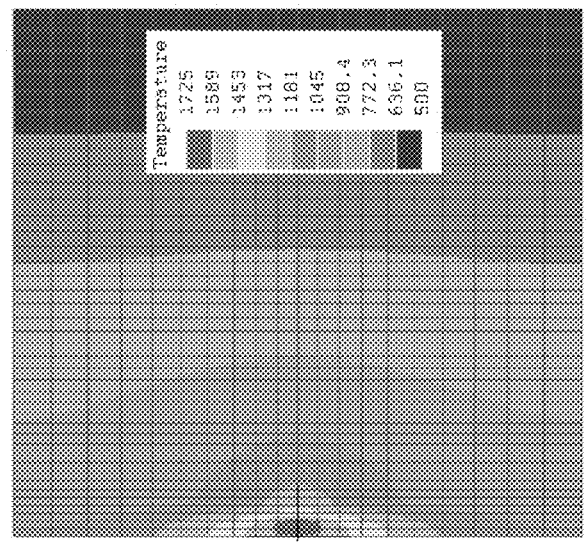
FIG. 15B shows temperature distributions of a dual layer W-PG target with the pyrolytic graphite (PG) having a low a-b plane thermal conductivity.
Figure 15A:
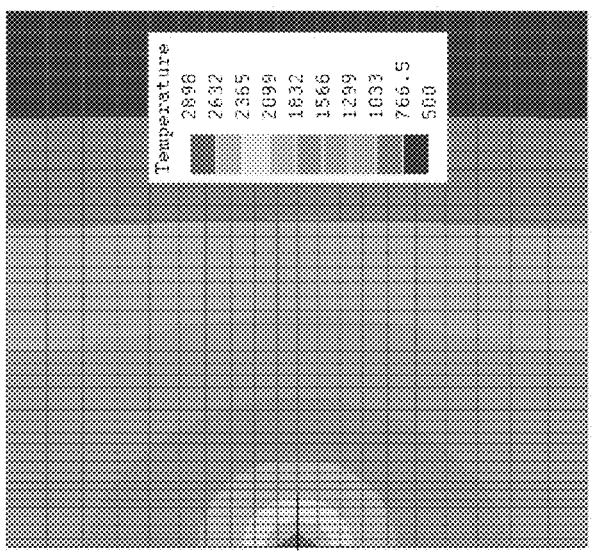
FIG. 15A shows the temperature distribution of a tungsten target, generated by a simulation.
Figure 15D:
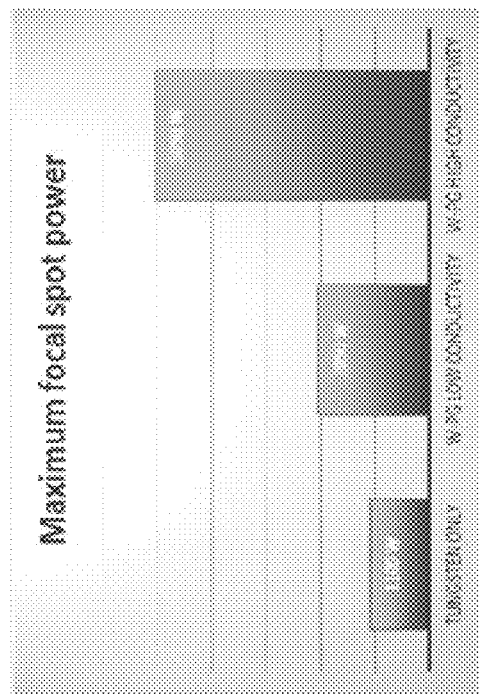
FIG. 15D shows maximum power allowed for the three types of anodes illustrated in FIGS. 15A-15C, while keeping focal spot temperature under 3000° C.

FIGS. 15A-15D show the results of thermal simulations. FIGS. 15A-15C show temperature distributions of tungsten target (15A), dual layer w-PG target with a low a-b thermal conductivity (15B), and dual layer w-PG with a high a-b thermal conductivity (15C). 1 kW power was provided to the targets and the right surface was kept at 500° C. FIG. 15D shows the maximum power allowed for the anodes while keeping focal spot temperature below 3000° C. Because thermal conductivity of PG varies greatly depending on the synthesis and annealing processes, thus low (400 $W \cdot m^{-1} \cdot K^{-1}$) and high (1700 $W \cdot m^{-1} \cdot K^{-1}$) thermal conductivity values were used in the simulations. The W-PG laminate targets have two layers of tungsten that share the total power. The right surface is kept at 500° C. as boundary condition. The thermal conductive a-b planes of PG in the target are perpendicular to anode surface, whereas in the body they are within the cross sectional plane. With 1 kW power deposited on the same 2 mm² focal spots, the maximum temperature reaches about 2900° C. for conventional tungsten anode (FIG. 15A), 1725° C. for the composite anodes with a low PG thermal conductivity value (FIG. 15B), and 993° C. for the anode with a high PG thermal conductivity value (FIG. 15C) respectively.

As shown in FIG. 15D, the W-PG laminate targets can sustain a power as high as 5 kW, five times higher than a traditional tungsten target. In the simulation, the W-PG target is modeled as two 5 μm thick W layers that equally share the power load. In reality, as many W layers as needed can be synthesized using the chemical vapor deposition method described below in Example 2. The thickness of W layers can be as thin as the atomic level if needed. The result indicates that 2-5 times larger focal spot power density can be achieved with the new anode technique.

Example 2: Fabrication of a W-PG Laminate Anode on an APG Base

This Example describes the fabrication of APG anode modules with W-APG laminate targets.

Figure 16B:
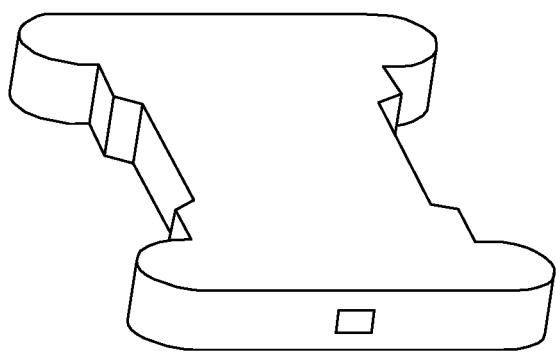
FIG. 16B shows the APG anode plate of the tube shown in FIG. 16A.
Figure 16A:
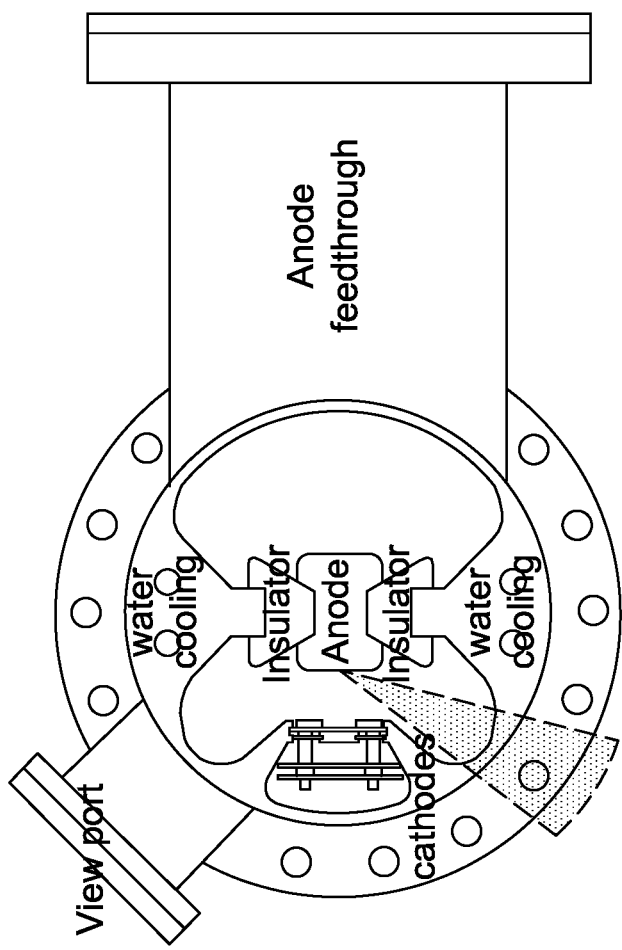
FIG. 16A shows a cross section of the MPTEX tube shown in FIG. 14A.

APG base: FIG. 16A shows the cross section of an MPTEX source and FIG. 16B shows the anode module of the MPTEX source. The anode is about 25 cm long made from a graphite bar brazed with a 5 mm thick tungsten target. Because of the symmetric temperature distribution in tube length (z) direction, the heat flows primarily in the cross sectional plane. Thus, the a-b plane of APG with large thermal conductivity needs to be aligned parallel to the tube cross section. The a-b plane of commercial APG plates synthesized with chemical vapor deposition (CVD) techniques is perpendicular to its thickness. Commercial APG plates can be purchased and machined into the dog-bone shape as shown in FIG. 16B. The APG plates may be coated with W-PG laminate target and then stacked together with the x-y planes of APG plates along the cross sectional plane (the dog-bone shaped plane). Each anode module plate can be 4 mm thickness, matching the cathode pixel spacing of MPTEX source. After W-PG laminate target is deposited on the lateral surface by the CVD technique (see the following paragraphs), the anode module plates can be stacked together to form an elongated anode. As the heat only transfers in the a-b plane, the imperfect contact between APG plates would not affect the heat dissipation. High temperature thermal adhesive can be applied to the top and bottom surfaces to improve the contact with the ceramic insulators (see FIG. 16A). Similar thermal paste has been applied between the aluminum housing and ceramic insulator interfaces.

Figure 17:
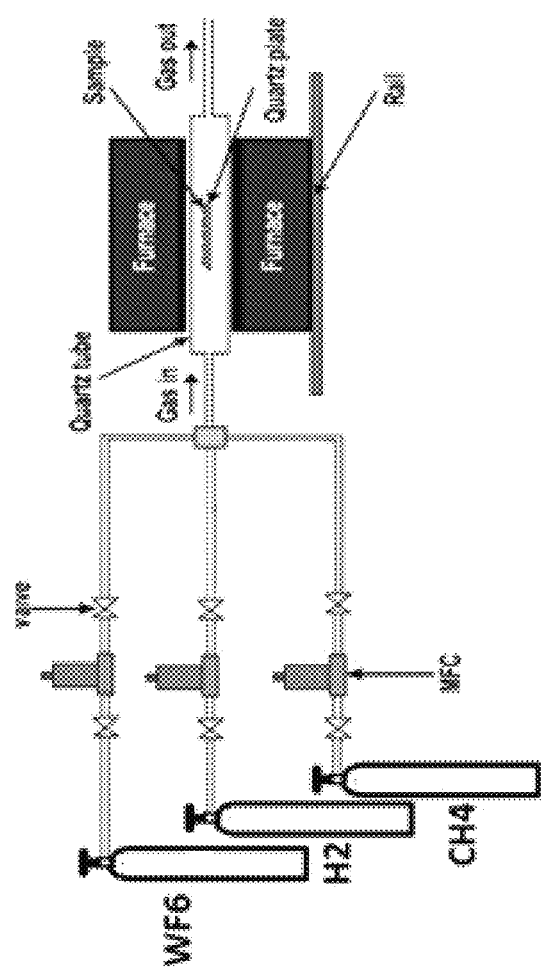
FIG. 17 shows CVD apertures for W and PG deposition.

CVD deposition of W-PG laminate target: Chemical vapor deposition (CVD) is a widely used process for forming solid materials, such as coatings, from reactants in the vapor phase. CVD deposition of tungsten on a graphite base is a technique used to fabricate x-ray tube anodes. PG or graphene is also produced in a process similar to tungsten CVD deposition, where hydrocarbon gas is heated until it breaks down into carbon. A CVD aperture for W and PG synthesis is set up in the arrangement as shown in FIG. 17. W and PG deposition can be switched by controlling the gas supplies.

The target deposited on anode with a CVD method can have a perfect or near perfect contact with the anode base material. CVD of tungsten is usually carried out using tungsten hexafluoride, WF6, which may be deposited in two ways:

$$WF_6 \rightarrow W + 3F_2, \quad (2)$$

$$WF_6 + 3H_2 \rightarrow W + 6HF. \quad (3)$$

The byproduct HF is very corrosive, but is tolerable for PG, which is very inert even in high temperature. The CVD reactions used to deposit GP are based on the thermal decomposition of hydrocarbons. An exemplary precursor is methane (CH4), which is generally pyrolyzed at 1100° C. or above, over a wide range of pressure from 100 Pa to $10^5$ Pa (1 atm). The reaction in a simplified form is as follows:

$$CH_4 \rightarrow C + 2H_2. \quad (4)$$

The thickness of tungsten or PG can be controlled by the deposition time. The W-PG target may only cover the focal spot instead of the entire lateral surface of APG plates. An enclosure with only focal spot area exposed is developed during CVD deposition of W. Once finished, the anode plate with laminate target may be examined with optical and scanning electron microscopes.

The graphene layers between W targets may have defect or mismatch after CVD. Annealing at a high temperature (e.g. up to 3000° C.), produces more planar and more uniform carbon structures that a low temperature, thus improving the thermal conductivity. The APG plate material is already annealed at the factory, but the PG layers deposited on the target by CVD method may be annealed, which improves thermal conductivity from ~400 to up to 1700 $W \cdot m^{-1} \cdot K^{-1}$, Although very thin, the APG layers, embedded between tungsten targets, are important in improving focal spot power density. After the laminate target is deposited with CVD, the anode module is placed in an induction oven for annealing. The APG plate is held by a tungsten frame and placed in a quartz tube. The tube is sealed and vacuumed during annealing to prevent oxidation. A disappearing-filament pyrometer is used to measure temperature during annealing.

Example 3: Evaluation and Optimization of W-PG Laminate Target

This Example describes the development of a technique to evaluate W-PG target and optimize its performance.

Various parameters, such as number of W-PG layers, thickness of each PG and W layers, annealing temperature and time need to be determined. The design is first guided by numerical simulation and then optimized through experimental studies.

Optimization of W-PG laminate target via Monte Carlo Simulation and FEA method: The Continuous Slow Down Approximation (CSDA) range of a 120 keV beam is about 15 µm. Thus, a total thickness of 10-15 µm for a W target is sufficient. The heat should be evenly divided to different W layers to achieve the best result. Monte Carlo (MC) simulation is used to determine the thicknesses of PG and W layers such that the power transferred to each W layer is approximate the same. The energy lost to the APG layers should be as low as possible. On the other hand, thinner APG conducts heat slower. Thus there is a balance between x-ray production efficiency and cooling performance. Thus MC simulation and FEA thermal simulation are used jointly to optimize the design. The actual thermal conductivity of thin PG layer can vary greatly. Numerical simulations are therefore used as a rough prediction, and the design is verified via experimental studies.

Experimental studies: After anode plates with W-PG laminated targets are fabricated, they are installed in the MPTEX tube to evaluate its performance. With a 100 kV anode voltage, the oxide cathodes can generate up to 100 mA current, enough to melt the tungsten target with a physical focal spot area of about 2 $mm^2$ (projected to 1 $mm^2$ by anode angle). To measure focal spot temperature directly, a viewport is installed on the MPTEX prototype as shown in FIG. 16A. Disappearing-filament pyrometer is not suitable for measuring the temperature of a small spot. A pyrometer camera can be mounted on the viewport and used to measure temperature. The focal spot temperature can be estimated from the color of focal spots, which changes with temperature.

The focal spot temperature can be measured with a DC load first. A small 10 mA current generates 1 kW focal spot power with a 100 kV anode voltage. Cooling water flow is kept constant during the measurement. The advantage of using an MPTEX tube for evaluation is that multiple anode samples can be tested in one setup. All anode modular pieces are 4 mm thick when stacked together, matching the cathode spacing. The focal spot temperature is compared with that of a standard 5 mm tungsten target.

Once the optimized W-PG lamination configuration is obtained, damaging tests are performed to evaluate its extreme performance. The cathode current is gradually increased while the water temperature is closely watched. Residual gas analyzer (RGA) is used to monitor partial vapor pressure in the vacuum chamber. A sudden increase of W or carbon (C) vapor pressure indicates the breakdown of a focal spot. A molten focal spot can also be visualized through the viewport.

Assuming the new anode has a power density twice as much as a solid tungsten target and each focal spot can sustain 4 kW power (P) with a maximum water temperature rise of 80° C., the water flow rate F is:

$$F = \frac{P}{C \cdot \Delta T} = \frac{4000 \ J \cdot S^{-1}}{4200 \ J \cdot kg^{-1} \times 80 \ K} = 0.012 \ kg \cdot S^{-1}. \quad (5)$$

For multi-pixel x-ray sources, the total power is nP, where n is the number of pixels. If n=50, a water flow rate of 0.6 kg/s or 9.5 gallons per minute is needed to allow the MPTEX source to operate continuously. This is manageable with the MPTEX tube design described herein. As shown in FIGS. 14A and 16A, the MPTEX tube has four 8 mm diameter water channels run through the aluminum tube housing, which allows a water flow up to 20 gallon per min.

What is claimed is:

1. A multi-pixel x-ray source, comprising:
   an anode including a plurality of anode modules, each anode module comprising:
      a base including an annealed pyrolytic graphite (APG) plate; and
      a target positioned on a lateral surface of the APG plate, the target comprising a focal spot, wherein the target is configured to emit x-rays from the focal spot when the focal spot is hit by electrons;
   a plurality of cathodes, each cathode facing the focal spot of a different one of the anode modules and each configured to emit electrons towards the focal spot of the anode module that it faces; and
   a tube housing enclosing the anode and the plurality of cathodes, the tube housing having a tube length direction along a length of the tube,
   wherein the APG plate of each anode module is oriented substantially perpendicular to the tube length direction of the tube housing, and an electron emission direction from one of the cathodes to the focal spot of the anode module that it faces is substantially perpendicular to the tube length direction.

2. The multi-pixel x-ray source of claim 1, wherein a transverse cross section of one of the anode modules forms a dog-bone shape that includes a narrowed section in the middle of the one of the anode modules, the multi-pixel x-ray source further comprising:
   two insulators each coupled to the one of the anode modules on opposing sides of the narrowed section, wherein a cross section of each of the two insulators along the electron emission direction is in a truncated triangular shape that includes a base side and two truncated sides forming a truncated end opposite the base side, and each of the two insulators is coupled to the one of the anode modules at the truncated end; and
   two water cooling devices each coupled to a different one of the two insulators at the base side of the one of the two insulators, each water cooling device extending from the base side toward the tube housing,
   wherein the two water cooling devices, the two insulators, and the one of the anode modules are aligned along an axis substantially perpendicular to the electron emission direction.

3. The multi-pixel x-ray source of claim 1, wherein a cross section of the tube housing along the electron emission direction forms a circle, one of the anode modules is positioned substantially at a center of the circle, a corresponding cathode to the one of the anode modules is positioned proximate a periphery of the circle, the multi-pixel x-ray source further comprises a viewport positioned on the tube housing and forming an angle of approximately 45° with the electron emission direction, and the one of the anode modules is configured to emit x-rays at an angle of approximately 45° with the electron emission direction opposite the viewport.

4. The multi-pixel x-ray source of claim 1, wherein the tube housing further comprises a viewport positioned on the tube housing, the viewport positioned to facilitate estimation of a temperature of the focal spot based on a color of the focal spot.

5. The multi-pixel x-ray source of claim 1, wherein the plurality of anode modules are stacked along the tube length direction.

6. The multi-pixel x-ray source of claim 1, wherein a thickness of the APG plate of each anode module is substantially the same as spacing between neighboring cathodes.

7. The multi-pixel x-ray source of claim 1, wherein the APG plate of each of the anode modules includes an a-b plane, and the a-b plane of the each APG plate is aligned with a heat conduction direction of its anode module.

8. The multi-pixel x-ray source of claim 1, wherein an a-b plane of the APG plate of each anode module is aligned with a transverse cross section of the APG plate.

9. The multi-pixel x-ray source of claim 1, wherein the target of each anode module comprises a plurality of tungsten layers each laminated in a pyrolytic graphite (PG) layer.

10. The multi-pixel x-ray source of claim 9, wherein the PG layer of the target is annealed.

11. A multi-pixel x-ray source, comprising an anode having a plurality of anode modules, each of the plurality of anode modules comprising:
    a base comprising an annealed pyrolytic graphite (APG) plate; and
    a target positioned on a lateral surface of the APG plate, the target comprising a focal spot, wherein the target is configured to emit x-rays from the focal spot when the focal spot is hit by electrons.

12. The multi-pixel x-ray source of claim 11, further comprising a tube housing enclosing the anode and having a tube length direction along a length of the tube housing, wherein the plurality of anode modules are stacked along the tube length direction.

13. The multi-pixel x-ray source of claim 11, further comprising:
    a plurality of cathodes each facing the focal spot of one of the plurality of anode modules and each configured to emit the electrons towards the focal spot,
    wherein a thickness of the APG plate of each anode module is substantially the same as spacing between neighboring cathodes.

14. The multi-pixel x-ray source of claim 11, wherein the APG plate of each of the anode modules includes an a-b plane, and the a-b plane of the each APG plate is aligned with a heat conduction direction of its anode module.

15. The multi-pixel x-ray source of claim 11, wherein an a-b plane of the APG plate of each anode module is aligned in parallel with a transverse cross section of the APG plate.

16. The multi-pixel x-ray source of claim 11, wherein the target of each anode module comprises a plurality of tungsten layers each laminated in a pyrolytic graphite (PG) layer.

17. The multi-pixel x-ray source of claim 16, wherein the PG layer is annealed.

18. The multi-pixel x-ray source of claim 16, wherein an a-b plane of the PG layer of each anode module is aligned with a heat conduction direction of its anode module.

19. The multi-pixel x-ray source of claim 16, wherein the plurality of tungsten layers of each anode module are stacked over one another in an orientation parallel to an a-b plane of the anode module's PG layer.

20. The multi-pixel x-ray source of claim 11, wherein the target of each anode module is deposited on a lateral surface of the APG plate by chemical vapor deposition (CVD).

* * * * *